US012378068B2

(12) United States Patent
Gentry et al.

(10) Patent No.: US 12,378,068 B2
(45) Date of Patent: Aug. 5, 2025

(54) REFUSE COLLECTION WITH AUGER AND CONTAMINATION DETECTION PANEL

(71) Applicant: The Heil Co., Chattanooga, TN (US)

(72) Inventors: David C. Gentry, Chattanooga, TN (US); Eric Evans, Fort Payne, AL (US); Bryan Stewart, Chattanooga, TN (US); Anthony B. Giles, Chattanooga, TN (US); Michael Shane Peek, Pisgah, AL (US)

(73) Assignee: The Heil Co., Chattanooga, TN (US)

( * ) Notice: Subject to any disclaimer, the term of this patent is extended or adjusted under 35 U.S.C. 154(b) by 197 days.

(21) Appl. No.: 17/811,246

(22) Filed: Jul. 7, 2022

(65) Prior Publication Data

US 2023/0011695 A1 Jan. 12, 2023

Related U.S. Application Data

(60) Provisional application No. 63/219,659, filed on Jul. 8, 2021.

(51) Int. Cl.
*B65F 3/22* (2006.01)
*B65F 3/14* (2006.01)

(52) U.S. Cl.
CPC .......... *B65F 3/22* (2013.01); *B65F 2003/146* (2013.01)

(58) Field of Classification Search
CPC ...... B65F 3/22; B65F 2003/146; B65G 43/08; B65G 2203/0291; B65G 2203/0208; B65G 2203/0233; B65G 2203/0241; B65G 2203/0258; B65G 2203/0266
USPC ..... 198/301, 341.08, 341.09, 358, 507, 572, 198/670
See application file for complete search history.

(56) References Cited

U.S. PATENT DOCUMENTS

| | | | | | |
|---|---|---|---|---|---|
| 2,488,966 | A | | 11/1949 | Dear | |
| 3,864,260 | A | | 2/1975 | Banner | |
| 3,952,856 | A | * | 4/1976 | Kurzweil | B65G 43/08 198/444 |
| 3,998,319 | A | * | 12/1976 | Mernoe | B65G 47/682 198/572 |
| 4,221,527 | A | | 9/1980 | Morrison | |

(Continued)

FOREIGN PATENT DOCUMENTS

| | | |
|---|---|---|
| CA | 3090428 | 8/2019 |
| CA | 2926762 | 9/2019 |

(Continued)

OTHER PUBLICATIONS

Office Action in Canadian Appln. No. 3,164,357, mailed on Feb. 26, 2024, 7 pages.

(Continued)

*Primary Examiner* — James Keenan
(74) *Attorney, Agent, or Firm* — Fish & Richardson P.C.

(57) ABSTRACT

A refuse collection vehicle includes a packer system with an auger screw, one or more refuse support panels, one or more sensing devices, and a refuse support panel actuator system. The refuse support panel(s) support refuse while characteristics of the refuse are sensed. The refuse support panel actuator system moves the refuse support panels such that refuse is released from the refuse support panels in to the packer system. A driver of the packer system rotates the auger screw such the refuse is packed into a storage compartment of the vehicle.

28 Claims, 20 Drawing Sheets

(56) References Cited

U.S. PATENT DOCUMENTS

| | | | | | |
|---|---|---|---|---|---|
| 4,227,849 | A | | 10/1980 | Worthington | |
| 4,260,316 | A | | 4/1981 | Gollnick | |
| 4,260,317 | A | | 4/1981 | Martin et al. | |
| 4,555,011 | A | * | 11/1985 | Brown | B65G 43/08 198/572 |
| 4,640,659 | A | | 2/1987 | Parks | |
| 4,792,033 | A | * | 12/1988 | Iwata | B65G 43/08 198/448 |
| 4,948,323 | A | | 8/1990 | Gasparini | |
| 5,636,122 | A | | 6/1997 | Shah et al. | |
| 5,857,822 | A | | 1/1999 | Christenson | |
| 6,103,110 | A | * | 8/2000 | Frommann | B01D 29/605 198/670 |
| 6,398,014 | B2 | * | 6/2002 | Belz | B65G 43/08 193/35 S |
| 6,827,542 | B1 | | 12/2004 | Stragier | |
| 7,563,066 | B2 | | 7/2009 | Jones et al. | |
| 8,037,991 | B2 | * | 10/2011 | Kluwe | B65G 43/08 198/572 |
| 8,763,784 | B2 | * | 7/2014 | Ziegler | B65G 43/08 198/572 |
| 9,884,585 | B1 | | 2/2018 | Lubbers | |
| 9,996,805 | B1 | * | 6/2018 | Lisso | B65B 35/00 |
| 10,427,871 | B2 | | 10/2019 | Fillion et al. | |
| 10,692,220 | B2 | | 6/2020 | Gao et al. | |
| 10,706,587 | B1 | | 7/2020 | Sorgi et al. | |
| 10,721,375 | B1 | | 7/2020 | Boyd et al. | |
| 11,010,903 | B1 | | 5/2021 | Gallaudet et al. | |
| 11,144,066 | B1 | | 10/2021 | Ebrahimi Afrouzi | |
| 11,319,147 | B2 | | 5/2022 | Maroney et al. | |
| 11,407,586 | B2 | | 8/2022 | Boivin et al. | |
| 2003/0031543 | A1 | | 2/2003 | Elbrink | |
| 2003/0215315 | A1 | | 11/2003 | Jones et al. | |
| 2011/0036738 | A1 | | 2/2011 | Hiltl | |
| 2011/0116899 | A1 | | 5/2011 | Dickens | |
| 2011/0188976 | A1 | | 8/2011 | Rowland et al. | |
| 2011/0190942 | A1 | | 8/2011 | Nicholson et al. | |
| 2011/0210124 | A1 | | 9/2011 | Da Silva et al. | |
| 2013/0039728 | A1 | | 2/2013 | Price et al. | |
| 2013/0083330 | A1 | | 4/2013 | Piana et al. | |
| 2013/0215270 | A1 | | 8/2013 | Murashita et al. | |
| 2013/0260448 | A1 | | 10/2013 | Wilson et al. | |
| 2013/0313419 | A1 | | 11/2013 | Nakazawa et al. | |
| 2014/0270495 | A1 | | 9/2014 | Tu et al. | |
| 2014/0379588 | A1 | | 12/2014 | Gates et al. | |
| 2015/0139536 | A1 | | 5/2015 | Jin et al. | |
| 2016/0232719 | A1 | | 8/2016 | Brinig et al. | |
| 2017/0237949 | A1 | | 8/2017 | Wang et al. | |
| 2017/0332199 | A1 | | 11/2017 | Elliott et al. | |
| 2017/0345169 | A1 | | 11/2017 | Rodoni | |
| 2018/0044109 | A1 | | 2/2018 | Butcher et al. | |
| 2019/0159162 | A1 | | 5/2019 | Hassan | |
| 2019/0366669 | A1 | | 12/2019 | Lapointe et al. | |
| 2020/0034785 | A1 | | 1/2020 | Romano et al. | |
| 2020/0247609 | A1 | | 8/2020 | Maroney et al. | |
| 2020/0346861 | A1 | | 11/2020 | Rocholl et al. | |
| 2020/0346862 | A1 | | 11/2020 | Rocholl et al. | |
| 2021/0039880 | A1 | | 2/2021 | Boivin et al. | |
| 2021/0078799 | A1 | | 3/2021 | Salinas et al. | |
| 2021/0354911 | A1 | | 11/2021 | Yhap et al. | |
| 2022/0097962 | A1 | | 3/2022 | Koga et al. | |
| 2023/0008771 | A1 | | 1/2023 | Fraas et al. | |

FOREIGN PATENT DOCUMENTS

| | | | | | |
|---|---|---|---|---|---|
| CA | 3040094 | | | 11/2019 | |
| DE | 20307479 | U1 | * | 7/2003 | B65F 3/22 |
| EP | 2058246 | | | 5/2009 | |
| EP | 2374737 | A1 | * | 10/2011 | B65F 3/22 |
| EP | 3483092 | | | 5/2019 | |
| EP | 3553698 | A1 | * | 10/2019 | B65F 3/00 |
| GB | 2333489 | A | * | 7/1999 | B65F 3/22 |
| KR | 20170109273 | | | 9/2017 | |
| WO | WO 2018189668 | | | 10/2018 | |
| WO | WO 2019153066 | | | 8/2019 | |

OTHER PUBLICATIONS

Extended Search Report in European Appln. No. 19840950.0, dated Sep. 10, 2021, 11 pages.

International Preliminary Report on Patentability in International Appln. No. PCT/CA2018/050149, dated Aug. 20, 2020, 7 pages.

International Preliminary Report on Patentability in International Appln. No. PCT/US2019/043771, dated Feb. 11, 2021, 9 pages.

International Search Report and Written Opinion in International Appln. No. PCT/CA2018/050149, dated Oct. 29, 2018, 8 pages.

International Search Report and Written Opinion in International Appln. No. PCT/US2019/043771, dated Nov. 12, 2019, 12 pages.

Rose et al., “A comparative life cycle assessment of diesel and compressed natural gas powered refuse collection vehicles in a Canadian city,” Energy Policy, 2013, 52:453-461.

* cited by examiner

REFUSE COLLECTION WITH AUGER AND CONTAMINATION DETECTION PANEL

CROSS REFERENCE TO RELATED APPLICATION

This application claims the benefit under 35 U.S.C. § 119(e) of U.S. Patent Application No. 63/219,659, entitled "Refuse Collection with Auger and Contamination Detection Panel," filed Jul. 8, 2021, which is incorporated herein by reference in its entirety.

BACKGROUND

In the refuse industry, refuse collection and processing often involves one or more stages in which different types of materials are handled separately. For example, recyclable materials (e.g., glass, paper, certain plastics, etc.) can be handled separately from non-recyclable refuse, and/or biodegradable refuse can be handled separately from non-biodegradable refuse. In some instances, a customer of a refuse collection company may be asked to separate recyclable and non-recyclable materials for separate pickup. Accordingly, the mixing of different types of materials, which would be separately handled, into a same refuse collection bin may pose challenges to a refuse collection and processing company. In addition, in some cases, contaminant materials in the refuse raise safety concerns, such as ignition of flammable/combustible material.

SUMMARY

Implementations of the present disclosure are generally directed to systems and methods for refuse collection that include identifying different types of materials that may be present in the refuse based on analysis of sensor data and/or other contaminant sensor data, and subsequent packing, sorting, separating, and/or disposal of the refuse after images and/or sensor data of the refuse have been captured.

In one aspect of the disclosure, a refuse collection vehicle includes a body having a storage compartment, a packer system with an auger screw, one or more refuse support panels, one or more sensors, and a refuse support panel actuator system. The refuse support panel(s) support refuse while characteristics of the refuse are sensed. The refuse support panel actuator system moves the refuse support panel(s) such that refuse is released from the refuse support panel(s) in to the packer system. A driver of the packer system rotates the auger screw such that refuse is packed into the storage compartment.

In some implementations, the refuse support panel actuator system moves the refuse support panel(s) to drop at least a portion of the refuse from the refuse support panel(s) onto the auger screw of the packer system.

In some implementations, the refuse support panel actuator system holds a flat surface of the refuse support panel horizontally while characteristics of the refuse on the refuse support panel are sensed.

In some implementations, the refuse support panel actuator system moves at least one of the refuse support panel(s) to change an angle of inclination of the refuse support panel(s) such that at least a portion of the refuse from the refuse support panel(s) is released onto the auger screw of the packer system.

In some implementations, the refuse support panel include a pair of doors. The refuse support panel actuator system swings the doors away from one another to drop refuse from the support panels onto the auger screw of the packer system.

In some implementations, the refuse support panel actuator system includes a linear actuator. The linear actuator moves the refuse support panels such that refuse is released from the refuse support panel onto the auger screw.

In some implementations, a refuse support panel includes a concave upper surface that holds refuse during snesing.

In some implementations, the refuse support panel actuator system rotates at least one of the refuse support panels to release refuse onto the auger screw of the packer system.

In some implementations, the refuse support panel actuator system translates at least one of the refuse support panel(s) to release at least a portion of the refuse from the one or more refuse support panels onto the auger screw of the packer system.

In some implementations, the refuse support panels include a conveyor belt. The sensors capture sensor data of the refuse while the refuse is carried on the conveyor belt.

In some implementations, a refuse support panel is coupled to a packing member of the packer system such that movement of the packing member moves the refuse support panel.

In some implementations, the sensors include a camera having one or more image sensors.

In some implementations, the refuse collection vehicle includes a lifting component that empties a container of refuse onto the refuse support panel(s).

In some implementations, the refuse collection vehicle includes a separator device that separates refuse on a refuse support panel from other items of refuse on the refuse support panel.

In some implementations, a separator device includes a robotic arm that picks items from the refuse support panel(s).

In some implementations, the refuse collection vehicle includes a computing device that distinguishes, based on sensor data captured by the one or more sensors, at least one item of refuse on a refuse support panel from at least one other item of refuse on the refuse support panel.

In some implementations, the refuse collection vehicle includes a computing device that detects, based on sensor data captured by the one or more sensors, contamination in the refuse on the refuse support panel.

In some implementations, the refuse collection vehicle includes a computing device that detects, in response to sensor data, a triggering condition for capturing an image.

In some implementations, the refuse collection vehicle includes a computing device that detects, in response to sensor data, a triggering condition for releasing refuse from a refuse support panel into the packer system.

In another aspect of the disclosure, a method of collecting refuse includes: placing refuse on a panel on a refuse collection vehicle; sensing one or more characteristics of the refuse on the panel; moving the panel to release at least a portion of the refuse from the panel; and turning an auger screw to pack at least a portion of the refuse that has been released from the panel into a storage compartment.

In some implementations, the method includes capturing one or more images of the refuse on the panel.

In some implementations, the method includes detecting contamination in the refuse from at least one of the one or more sensed characteristics of the refuse on the panel.

In some implementations, the method includes dumping at least of portion of the refuse on the panel into a packer system.

In some implementations, the method includes separating at least one of the items on the panel from one or more other items on the panel.

In another aspect of the disclosure, a refuse collection vehicle includes a body having a storage compartment, a packer system, one or more refuse support panels, one or more sensing devices, and a refuse support panel actuator system. The refuse support panel(s) support refuse while characteristics of the refuse are sensed. The sensing device(s) sense one or more characteristics of the refuse while the refuse is in or on the refuse support panel(s). The refuse support panel actuator system includes one or more actuators that move the refuse support panels such that refuse is released from the refuse support panel(s) to the packer system. The packer system is operable to pack refuse into the storage compartment.

In another aspect of the disclosure, a method of collecting refuse includes: placing refuse on a panel on or in a refuse collection vehicle; sensing one or more characteristics of the refuse on the panel; moving the panel to drop at least a portion of the refuse from the panel; and packing at least a portion of the refuse that has been released from the panel into a storage compartment.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
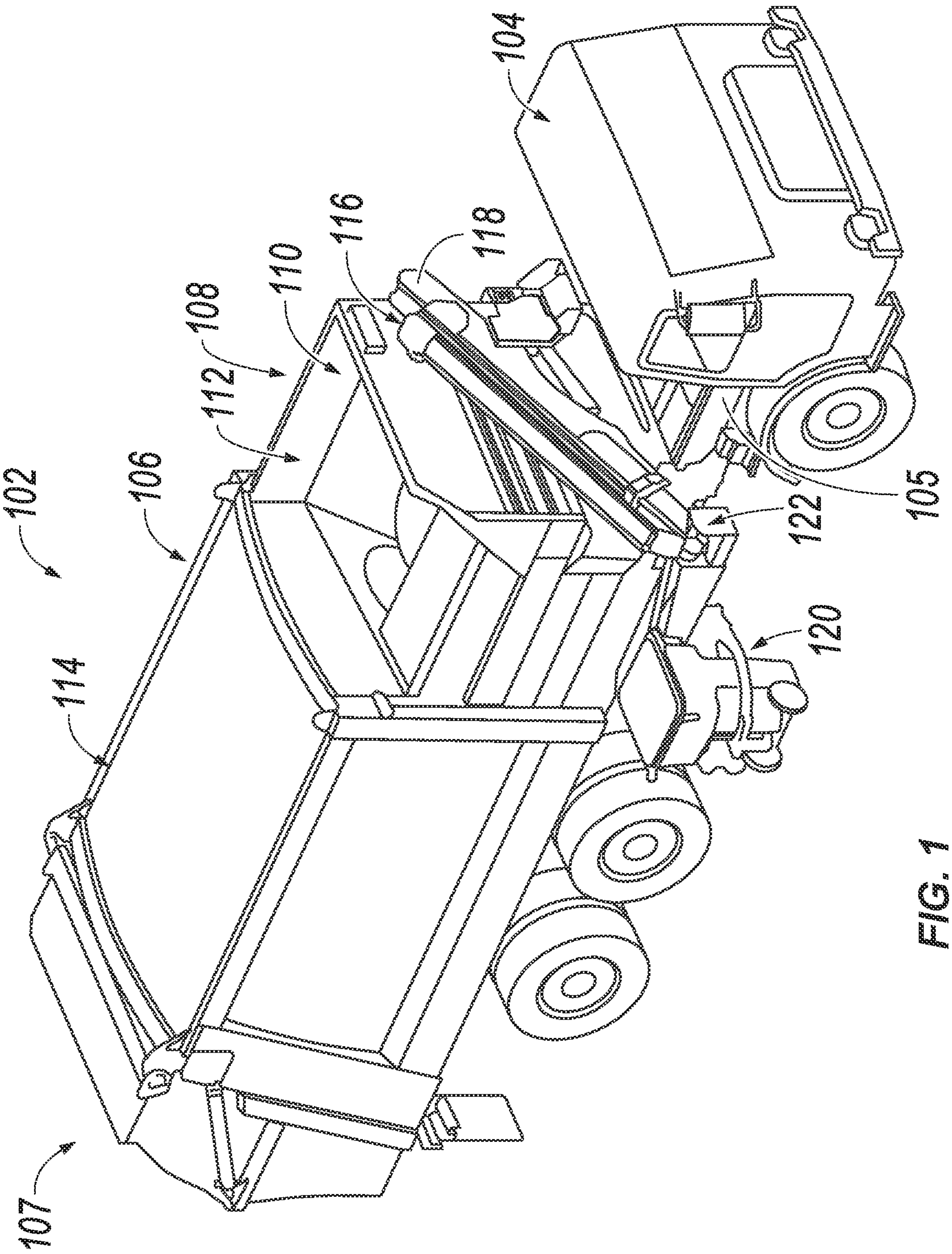
FIG. 1 depicts an example of refuse collection vehicle including an automatic side loading mechanism, a contamination detection system, and a packer system.

Implementations of the present disclosure relate to systems, devices, methods, and computer-readable media for identifying different types of materials that may be present in refuse, based at least partly on analysis of image data and/or other contaminant sensor data generated by camera(s), other contaminant sensor device(s), and/or other device(s) that are components of a refuse collection vehicle (RCV) or that are otherwise in proximity to the RCV, and subsequent packing, sorting, separating, and/or disposal of refuse after images and/or sensor data of the refuse have been captured. Some implementations include a contamination detection panel that releases refuse to an auger system for packing into a storage compartment of the RCV.

In some implementations, an RCV includes a refuse support panel on which refuse can be placed for gathering image and/or sensor data for identifying material types and/or contamination. An actuator system for the refuse support panel can be operated to release the refuse that has been imaged/sensed (or a portion of such refuse) into an auger system for compaction and/or ejection from the RCV. In certain implementations, a packing system for an RCV includes an auger system and a platen packer system that can be used in combination with one another to compact and eject the refuse.

During (or after) the collection of refuse by a RCV, one or more images of refuse can be generated by camera(s) that are in, on, or in proximity to the RCV. The image(s) can be analyzed to detect different types of materials that may be present in the refuse, such as the presence of recyclable materials in refuse that is otherwise expected to be non-recyclable. In some examples, the identification of material(s) in collected refuse can trigger the sending of an alert notification to one or more individuals, and/or other actions. In some implementations, various machine learning (ML) trained models can be employed to identify contamination in a refuse stream.

In some implementations, the image(s) of the refuse are generated while the refuse is in a substantially stationary state, such as after it has been emptied into or onto some component of the RCV. For example, the image(s) can be taken of the refuse after it has been emptied into a hopper of the RCV, such that a set of image(s) is taken of a top or near-top layer of refuse (e.g., the recently emptied refuse) in the hopper after each instance when a refuse container has been emptied into the hopper (e.g., after each instance of service a refuse collection customer). In some implementations, the refuse may be initially emptied onto or into a particular structural component of the RCV, and the image(s) may be taken of the refuse while it is on or in the structural component. The refuse may be subsequently moved (or allowed to fall) into the hopper after the image(s) have been taken. In this way, the image(s) may be taken while the emptying of the refuse from the container into the hopper is temporarily interrupted by a structure in the RCV, such as a ledge, gate, some other surface, or intermediary refuse holding chamber. Such examples are described further below.

In some instances, the emptying of a refuse container by an RCV includes emptying the refuse container into a receptacle that is being transported by the RCV but that is not a permanently attached component of the RCV, instead of being emptied into a hopper of the RCV. Examples of such a receptacle can include, but are not limited to, an intermediate collection device (e.g., carried by an arm of the RCV) and a carry can. The receptacle can be an automated can or a semi-automated can, such as a carry can with tipper mechanism. In some implementations, the image(s) of the refuse are generated while the refuse is falling into the collection receptacle that is being transported by the RCV but that is not a component of the RCV itself.

In some implementations, operational sensor devices are located at various positions on the vehicle and arranged to generate operational sensor data that indicates a current operational state of one or more body components of the vehicle. As used herein, a body component describes a component of the vehicle that is not directly involved in causing the translational movement of the vehicle from one location to another. A body component is also referred to as a vehicle body component. For example, a body component can be a lifting component (e.g., lift arm) that operates to lift a refuse container and/or empty the refuse held by the the refuse container into a hopper of the RCV or other receptacle. Other types of body components are described below. The operational sensor data can be analyzed to determine the presence of a triggering condition that is based at least partly on the state or position of at least one body component, such as the lifting component being at a particular position in its cycle to lift and empty a refuse container into the hopper of the vehicle. Triggering conditions can also be based on other factors, such as the speed, deceleration, and/or location of the vehicle.

Based on a time when the triggering condition is present, one or more images of the refuse can be analyzed to determine different types of materials present in refuse in an RCV. For example, the image(s) can be generated at a time that is offset from a time when a lift arm empties a container into the hopper or intermediate collection device, such as three seconds after the time when the refuse would have fallen into the hopper or can and come to rest. As another example, the image(s) can be generated at a time when the lift arm completes its cycle of empting a container, such as at the time when the lift arm would have replaced the emptied container back onto the ground.

In some implementations, determination of container overages can be through a user interface (UI) that displays various image(s) of refuse associated with refuse collection events, such as the emptying of different containers associated with different customers. A user can use control(s) of the UI to identify those image(s) that show different types of materials in the refuse, such as image(s) of refuse that contains recyclable materials. In some implementations, the image data can be provided to an image classification engine that has been trained or otherwise developed, using one or more suitable machine learning (ML) techniques, to analyze the image(s) and identify those image(s) that show the presence of different types of materials. ML techniques are also referred to herein as artificial intelligence (AI). For example, an engine can be trained to distinguish between recyclable materials and non-recyclable materials in the refuse stream. Other suitable techniques can also be employed to identify the presence of different types of materials in the refuse, such as image analysis that includes object recognition to recognize particular types of objects or materials. In some examples, spectral analysis can be employed to identify materials based on characteristic emissive and/or reflective properties of the materials. For example, a particular material can be characterized as emitting a particular, characteristic spectrum of visible, infrared (IR), ultraviolet (UV), and/or other ranges of the electromagnetic (EM) spectrum. The image(s) can be analyzed to look for that characteristic spectrum, and the presence of materials in the refuse can be determined based on such analysis. In some examples, variable-intensity light sources and/or emitters may be employed inside the hopper or elsewhere to generate the data that is analyzed.

Although examples herein may describe analyzing image(s) in the visible light spectrum to identify different types of materials in the refuse, implementations are not so limited. Implementations can also employ other ranges of the EM spectrum to identify materials, such as through analysis of images that capture emissions in the IR, microwave, or UV ranges. Implementations can also employ other types of contaminant sensors to detect the presence of materials in the refuse, such as radar or ultrasound probing. The imaging of the refuse can be passive, such as capturing image(s) of the refuse using camera(s). The imaging of the refuse can also be active, such as through using EM, sonic, or other types of probing to send a signal toward the refuse and detect any signal(s) reflected back from the refuse. In some implementations, the probing can activate radio-frequency identification (RFID), near-field communication (NFC), and/or other types of transmitters that may be present in the refuse. The materials in the refuse can then be identified based on signal(s) detected from the transmitters. In such examples, the data analyzed to identify contamination may include a non-image data stream that is processed sequentially and/or by frequency band, or in the frequency domain following a Fourier transform of the data.

Various action(s) can be performed based on the identification of different types of materials in the refuse. For example, a notification message can be sent to various individual(s) to describe the materials detected in a particular collection of refuse that has been collected from a particular customer, in instances where the refuse collected from that customer includes recyclables, biodegradable materials, and/or other materials that may be undesirable in that particular collection stream. As another example, an account of the owner (or entity responsible for the container) can be charged to compensate a refuse collection organization for handling the collection of refuse that has a particular mix of materials. In some implementations, some of the refuse that has been sensed/imaged is separated from the rest of the refuse that has been sensed/imaged. In certain implementations, an RCV includes a robotic arm that can be operated to pick items of refuse from a refuse support panel and remove the picked items from other items on the refuse support panel.

Identifying contaminants (unexpected or undesirable materials in a refuse stream) is important to the recycling industry because most recyclables today are collected via single-stream recycling. The ability to bring a pure stream of recyclable material back to the recycling facility increases and preserves the value that can be reclaimed from those materials, and decreases the amount of waste and expense that facility operators must manage. Implementations provide techniques for classification of materials within refuse, to help ensure a more efficient pure stream of recyclable (or non-recyclable) material. Contamination can refer to the presence of non-recyclable material in a stream that is expected to be recyclable, the presence of a recyclable material in a stream that is expected to be non-recyclable, and/or in general the presence of an unsuitable, unexpected, and/or undesirable material in a refuse stream.

In some implementations, the classification employs a ML-powered object classification using camera(s) and/or other contaminant sensor(s). The camera(s) and/or other contaminant sensor(s) collect image data (e.g., still image(s) and/or video data) and/or other contaminant sensor data which is analyzed, using a suitable ML and/or AI technique, to determine materials that are present in refuse, and determine whether undesirable materials are present in refuse. For example, the determination may identify the presence of recyclable materials in a stream that is expected to be non-recyclable, and/or identify the presence of non-recyclable materials in a stream that is expected to be recyclable. Accordingly, the analysis may determine when an unsuitable type of material is present in a stream of refuse. The analysis can employ time-of-flight calculations. Further, the analysis can employ single and/or dual sensor and/or camera combinations for binocular distance determination, size determination, and/or other determinations.

In some implementations, vehicle 102 includes one or more cameras. Cameras can be used, for example, to detect or monitor the position or state of refuse in the vehicle, the position or state of vehicle sub-systems or their components, or other characteristics. As used herein, a "camera" includes any device that can be used to capture an image. Images can include still images and video images. A camera can include one or more image sensors. A camera can also include other types of sensors (e.g., audio sensors, heat sensors). Cameras and/or sensor devices can include, but are not limited to, one or more of the following: visible spectrum cameras, thermal (IR) cameras, temperature sensors, IR sensors, UV sensors, ultrasonic (ultrasound) sensors, Doppler-based sensors, time-of-flight (TOF) sensors, color sensors (e.g., for determining, RGB data, XYZ data, etc., with or without IR channel blocking), microwave radiation sensors, x-ray radiation sensors, radar, laser-based sensors, LIDAR-based sensors, thermal-based sensors, spectral cameras (e.g., including hyper- and/or ultra-spectral imaging technology that use spectral fingerprints to classify very small objects at high speeds), and so forth.

Implementations may be employed with respect to any suitable type of RCV, with any suitable type of body and/or hopper variants. For example, the RCV may be an automated side loader vehicle, with cameras and/or other contaminant sensors at the hopper opening. The other contaminant sensors may also include a weight sensor in the lift arm to provide data to determine a likelihood of contamination based at least partly on weight (e.g., given that recyclables are usually not heavy). Weight information can be used to determine the likely weight of an uncontaminated volume, and determine contamination based on deviations from expected weight.

As another example, the RCV can be a commercial front loader (e.g., for dumpster type containers), with cameras and/or other sensors at the hopper opening. In some instances, data from on-vehicle cameras and/or other sensors can be correlated with data provided by cameras and/or sensors in the containers, to identify contamination.

As another example, the RCV can be a residential front loader. A front loader can be provided with or without an intermediate collection device. The intermediate collection device can be used, for example, to collect residential-sized containers. A front loader can be provided with cameras and/or other sensors at hopper opening and/or at the front of the body (e.g., above the bumper) to view into the intermediate collection device. Cameras and/or other sensors can also be located in the intermediate collection device itself. In such instances, weight sensors can be located on the arm of the intermediate collection device and/or on the lift arms attached to the intermediate collection device, to detect changes in weight of carried refuse and determine possible contamination based on weight.

As another example, the RCV can be a rear loader, with cameras and/or other sensors embedded in an acrylic strip or other suitable component (e.g., across the floor of the rear hopper). In such examples, an analysis of the refuse can be performed during the sweep motion of the tailgate compactor, as it pulls the refuse across the strip of various sensors. Moreover, the cameras and/or other sensors can view the waste as it sits in the rear hopper, in a stationary state that is suitable for collection of image(s) and/or other contaminant sensor data.

In some implementations, the image(s) and/or other contaminant sensor data can be captured while the refuse is stationary in the intermediate collection device. Moreover, the image(s) and/or other contaminant sensor data can be captured while the refuse is falling into the intermediate collection device, or into some other structure that is being conveyed by the RCV but that is not an attached component of the RCV, which as while the lift arm of the RCV is operating to empty a container into the intermediate collection device that is being conveyed by the RCV. Image(s) and/or other contaminant sensor data can also be captured while the refuse is in other components of the RCV, and/or in containers that are external to the RCV, such as in stationary compactors, stationary containers (e.g., dumpsters), and so forth.

In some implementations, an in-container camera can be employed to capture information regarding refuse while the refuse is in the container. Such image data, and/or other contaminant sensor data from the interior of containers, can be used to identify contamination. In some examples, such data can be used in combination with weight information describing a change in weight over time, where such weight in formation is captured by weight sensors in the feet or other supporting components of the container. In some implementations, weight information (e.g., measured by on-container sensors and/or in-RCV sensors) can be used in combination with image data (e.g., in-container camera images and/or on-RCV camera images) and/or other contaminant sensor data to train a classification engine, using any suitable ML or AI technique, to identify the presence of contaminating materials in a portion of refuse, as described further herein. The image data can also include image(s) of a container prior to the container being picked up an emptied. Such image(s) can be used in the analysis to determine likelihood of contamination, likelihood of overage (e.g., overfilled container), and/or other issues or problems. In general, implementations can employ an array of contaminant sensors (e.g., cameras and/or other types of sensors) to collect data that is correlated and/or otherwise analyzed to identify contamination or other issues present in a refuse stream.

Implementations can enable the optimization of burden depths of incoming refuse in an RCV hopper, intermediate collection device, stationary compactor, and/or other refuse receptacles, to enable optimal separation of refuse and to improve accuracy of classification of material or contamination in a RCV or compactor, including identifying contamination before the different types of refuse are comingled in the compactor and/or RCV.

FIG. 1 depicts an example of refuse collection vehicle including an automatic side loading mechanism, a contamination detection system, and a packer system. Refuse collection vehicle 102 includes a cab 104, a frame 105, a body 106, a tailgate 107, a contamination detection system 108, and a packer system 110. Body 106 defines a hopper 112 and a storage compartment 114. A wall (or partition, etc.) separates hopper 112 from storage compartment 114. A container collection arm 116 is secured behind cab 104 to the hopper 112.

The container collection arm 116 includes a telescoping boom 118 and a grasping assembly 120. The grasping assembly 120 is secured to the boom 118 via a rotary actuator 122. The rotary actuator 122 manipulates the grasping assembly 120 to level the container during lifting. Additionally, the rotary actuator 122 initiates dumping of the container into the hopper 112.

In some implementations, vehicle 102 is an all-electric vehicle. Motive power and various body controls and subsystems on the vehicle (including packer system, ejector system, door actuator system, and contamination detection system) can be electrically powered.

Figure 2:
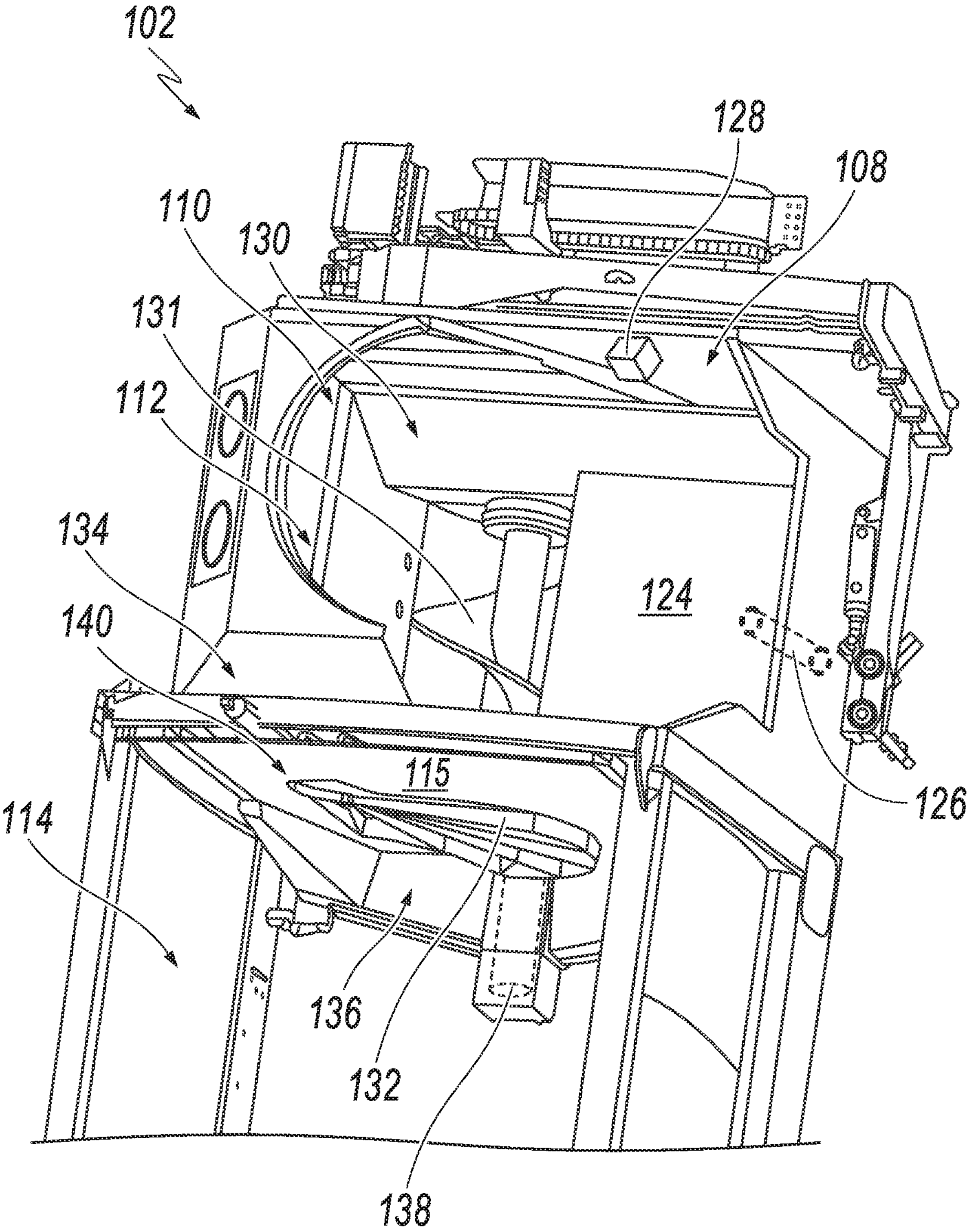
FIG. 2 is an overhead view of an RCV including a contamination detection system having a refuse support panel, according to implementations of the present disclosure.

FIG. 2 is an overhead view of vehicle 102 including a contamination detection system 108 having a refuse support panel. Vehicle 102 also includes a packer system 110 having an auger screw and an ejector.

Contamination detection system 108 includes refuse support panel 124, refuse support panel actuator system 126, and sensor 128. Contamination detection system 108 may also include a control system (not shown in FIG. 2). The control system can be coupled to refuse support panel actuator system 126 and sensor 128. The control system may receive information from sensor 128 and other sensors on the RCV. The control system can use the information from sensor 128 and/or other sensors to control refuse support panel actuator system 126. In some implementations, sensor 128 is an image sensor. For illustrative purposes, only one of sensors 128 is shown in FIG. 2. A contamination detection system may, however, include any number of sensors. Each of the various sensors can provide image data and/or other sensor data to be used in contamination detection, refuse processing, or other vehicle operations.

Packer system 110 includes a drive system 130, an auger screw 131, a door 132, a door actuator system 134, an ejector 136, and an ejector actuator system 138. In this example, ejector 136 includes wall 115. Wall 115 separates hopper 112 from storage compartment 114. Door 132 is coupled to swing on wall 115 at hinge joint 140. Ejector actuator system 138 can be operated to advance ejector 136 to the rear of storage compartment 114, or to retract ejector 136 toward the front of vehicle 102. Door actuator system 1134 can be operated to move door 132 to selectively cover and uncover an opening in wall 115.

In one implementation, the powertrain motor, contamination detection system 108, auger screw 131, door actuator system 134, and ejector actuator system 138 are all electrically powered. In some implementations, the powertrain motor, contamination detection system 108, drive system 130 (for auger screw 131), door actuator system 134, and ejector actuator system 138 receive power from a common electrical energy storage system (e.g., a common battery pack). In other implementations, one or more of contamination detection system 108, drive system 130, door actuator system 134, and ejector actuator system 138 receive power from a different electrical energy storage system than the powertrain motor.

Figure 3:
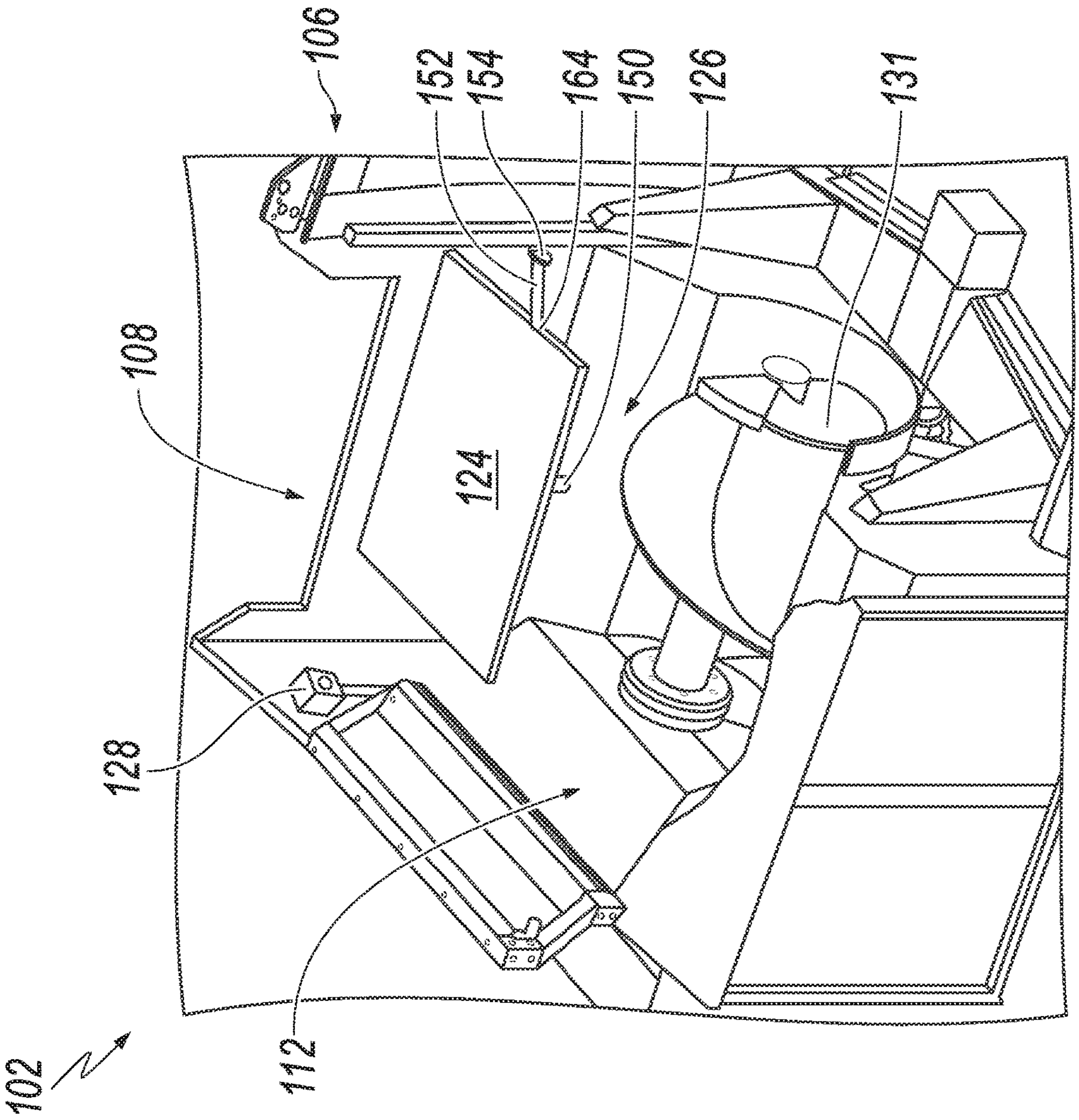
FIG. 3 is an overhead perspective view of an RCV including a contamination detection system including a refuse support panel actuator system, according to implementations of the present disclosure.

FIG. 3 is an overhead perspective view of vehicle 102 including a contamination detection system including a refuse support panel actuator system. In FIG. 3, some portions of the body and packer system have been omitted for illustrative purposes. Contamination detection system 108 includes refuse support panel 124, refuse support panel actuator system 126, and sensor 128. Refuse support panel actuator system 126 includes actuator 150 and support panel links 152 (in this example, there is one support panel link at each of the opposing ends of refuse support panel 124). Actuator 150 (partially hidden by refuse support panel 124 in FIG. 3) is coupled between refuse support panel 124 and body 106. Support panel links 152 are attached to body 106 at body pivot joint 154 and attached to refuse support panel 124 at panel pivot joints 156. Refuse received into hopper 112 can be deposited on refuse support panel 124 and subsequently released onto auger 131.

Figure 4:
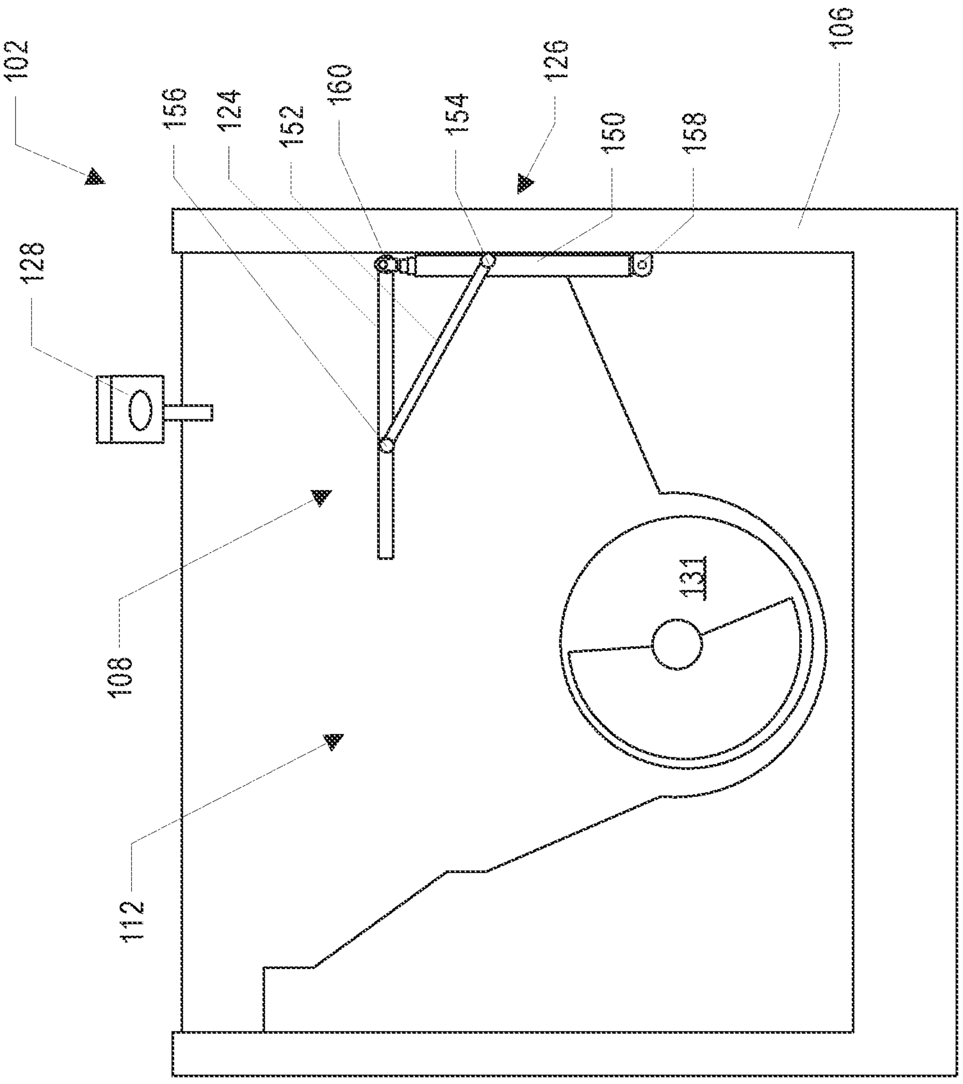
FIG. 4 is a rear view of an RCV including a contamination detection system, according to implementations of the present disclosure.

FIG. 4 is a rear cutaway view of a vehicle 102 including a contamination detection system 108. In FIG. 4, some portions of the body and packer system have been omitted for illustrative purposes. Actuator 150 of refuse support panel actuator system 126 is attached to body 106 at actuator base joint 158 and pivotally coupled to refuse support panel 124 at panel lift joint 160. Support panel links 152 are attached to body 106 at body pivot joint 154 and attached to refuse support panel 124 at panel pivot joints 156. In this example, sensor 128 is located over refuse support panel 124 such that sensor 128 can capture image data or other sensor data of material on refuse support panel 124.

Actuators in contamination detection system 108, door actuator system 134, and ejector actuator system 138 can be linear actuators. As used herein, a linear actuator includes any device or combination of devices that creates motion in a straight line. Examples of linear actuators include lead screw actuators, push-pull chain actuators, chain drive actuators, belt drive actuators, ball screw actuators, rack-and-pinion actuators, hydraulic actuators, and pneumatic actuators. In some implementations, one or more of the actuators is an electric actuator. An electric actuator can include any of various devices that uses electrical power to produce motion.

Figure 5:
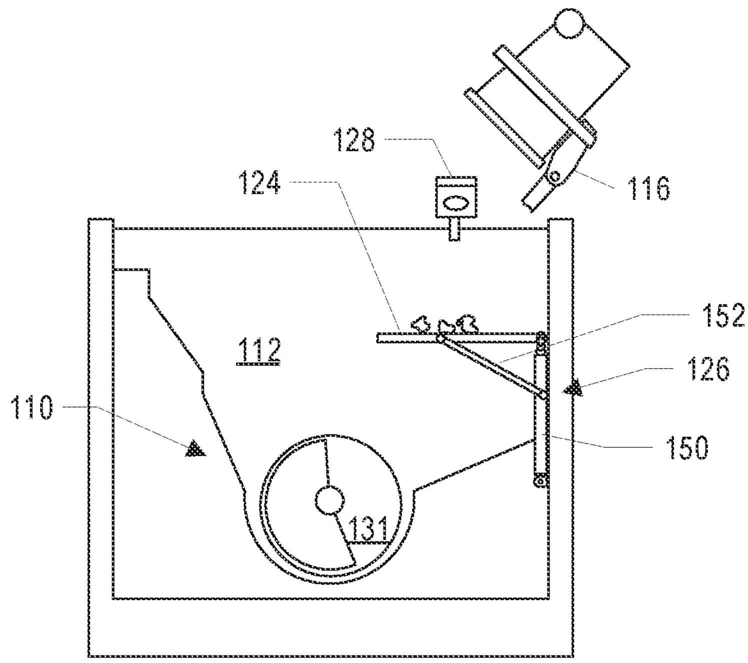
FIGS. 5 and 6 illustrate placing refuse on a refuse support panel for contamination detection and releasing the refuse to an auger system.
Figure 6:
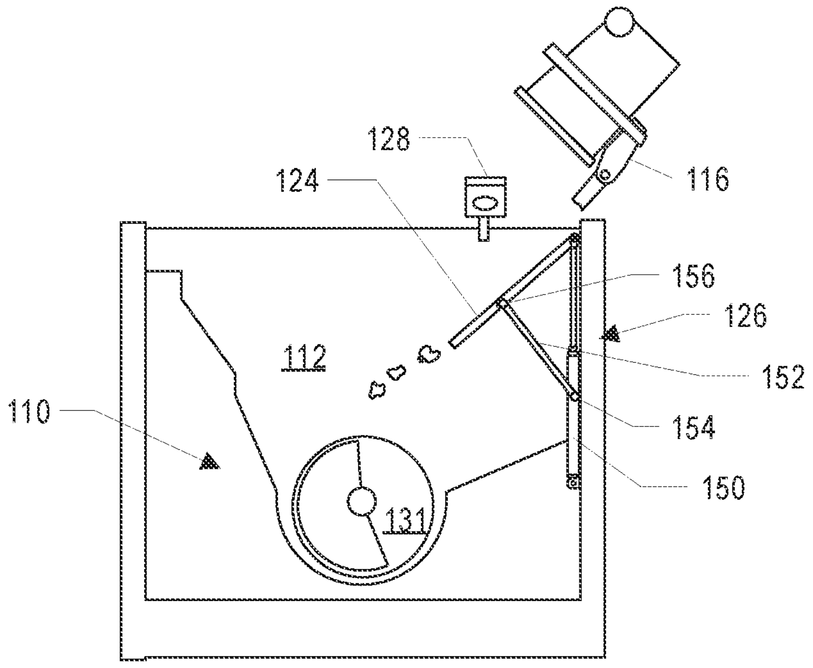

FIGS. 5 and 6 illustrate contamination detection in refuse and subsequent release of the refuse to an auger system. FIG. 5 illustrates placing refuse on a refuse support panel for contamination detection. Refuse support panel 124 is located in hopper 112 above auger screw 131 of packer system 110. Initially, refuse support panel actuator system 126 may be operated to position refuse support panel 124 horizontally in the position shown in FIG. 5. Container collection arm 116 can be used to empty refuse from a container into hopper 112 and onto refuse support panel 124. With refuse support panel 124 in a horizontal position, sensor 128 can be operated by a control system to capture image data and/or other sensor data about the refuse that is resting on refuse support panel 124.

FIG. 6 illustrates release of refuse from a refuse support panel to an auger system. Auger screw 131 is below refuse support panel 124 in hopper 112. Once image data and/or other sensor data of refuse on refuse support panel 124 has been captured using sensor 128, refuse support panel actuator system 126 can be operated to move refuse support panel 124 to release refuse onto auger screw 131. In this example, refuse support panel 124 is tilted from a horizontal position by raising actuator 150 such that the edge of refuse support panel 124 nearest to body 106 is raised as refuse support panel 124 pivots about pivot joints 154, 156 at the ends of links 152. As refuse support panel 124 is tilted, refuse may slide off the panel onto auger screw 131. As further described below, packer system 110 can be operated to compact and eject refuse that has been released from refuse support panel 124.

Referring again to FIG. 2, drive system 130 can be operated to rotate auger screw 131 to advance refuse into storage compartment 114. After material is pushed into storage compartment 114 by auger screw 131, the refuse can be further compacted by the ejector 136.

When auger screw 131 is not in use, door 132 can be in a closed position over the opening in wall 115. Door 132 may inhibit refuse that has been pushed into storage compartment 114 from migrating back through wall 115 when ejector 136 is operated to compact or eject refuse in storage compartment 114.

In the implementations described above with respect to FIGS. 1-6, the refuse support panel includes a flat upper surface. The surface of a refuse support panel may, however, have other shapes. For example, the refuse panel may be curved, convex, u-shaped, vee-shaped, undulating, or irregular. The refuse support panel can be held in a position other than horizontal during imaging of refuse. For example, in certain implementations, image or other sensor data is captured while the refuse is on a sloped surface. The surface of a refuse support panel can be flat, curved, sloped, or otherwise shaped or oriented in any way suitable for detecting contamination. In certain implementations, a refuse support panel is flexible.

Figure 7:
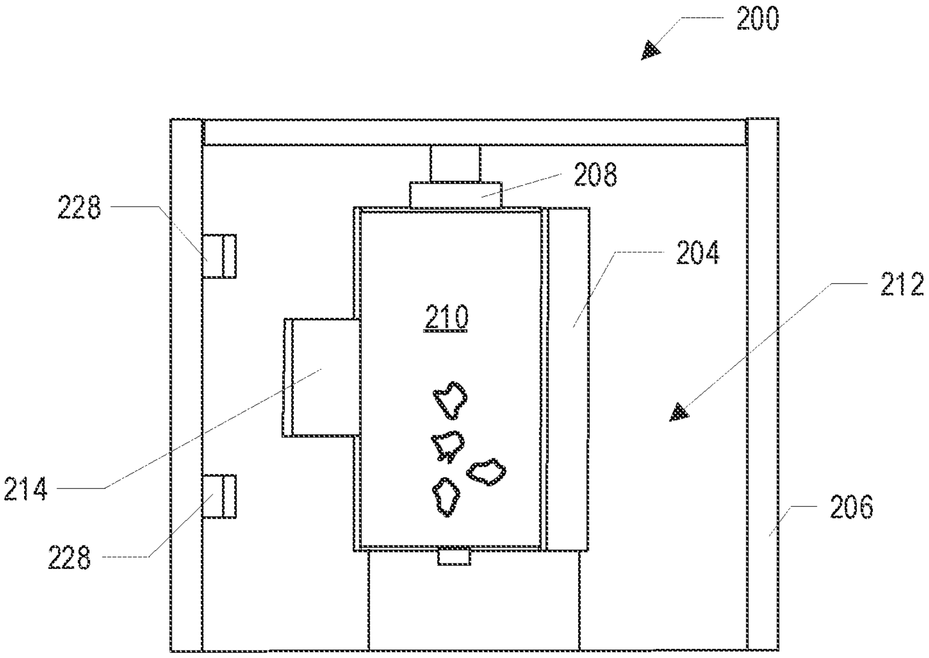
FIG. 7 is a top schematic view of a curved surface refuse support panel that releases refuse to an auger packer system, according to implementations of the present disclosure.
Figure 8:
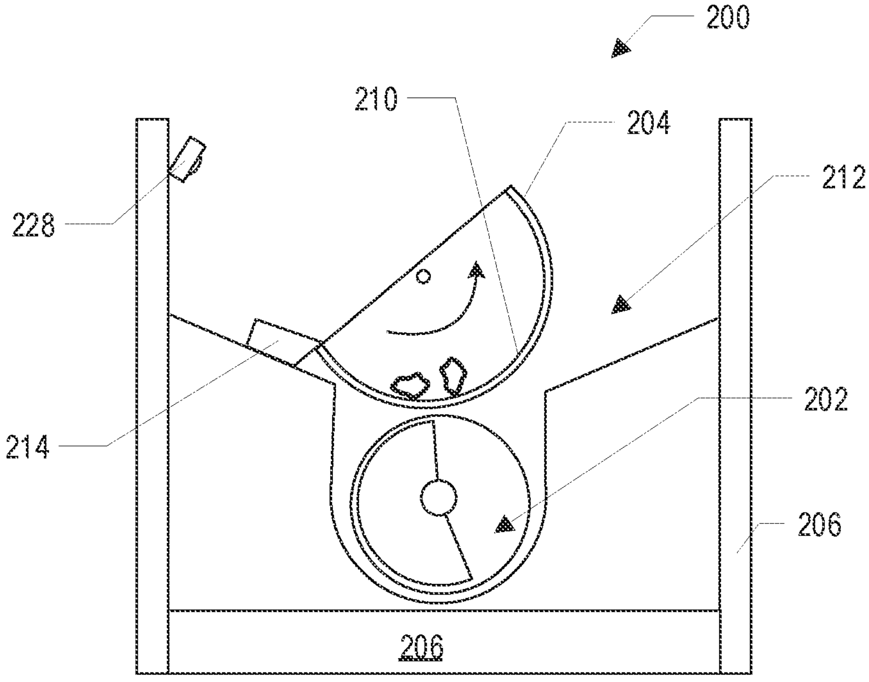
FIG. 8 is a rear schematic view of a curved surface panel illustrated in FIG. 7.

FIG. 7 is a schematic top cutaway view of a curved surface refuse support panel that can release refuse to an auger system. FIG. 8 is a schematic rear cutaway view of the curved surface support panel illustrated in FIG. 7. Vehicle 200 includes a body 206, a hopper 212, an auger system 202, a refuse holder 204, rotary actuator 208, and sensors 228. Refuse holder 204 is mounted above auger system 202. In this example, refuse holder 204 has a generally half-barrel shape with opposing end walls. The cylindrical wall of refuse holder 204 forms a curved refuse support panel 210 on which refuse can be deposited.

Rotary actuator 208 is mounted on body 206. Rotary actuator 208 can be coupled to a control system, such as described herein relative to FIG. 22. Rotary actuator 208 can be operated to rotate refuse holder 204 in either direction.

Initially, refuse holder 204 may positioned against stop 214. After refuse has been deposited in refuse holder 204, sensors 228 can be operated to capture images of refuse on refuse support panel 210. Once images and/or other sensor data of the refuse have been captured, rotary actuator 208 can be operated to rotate refuse holder 204 in the direction of the arrow shown in FIG. 8, such that refuse on refuse support panel 210 is released into auger system 202. Auger system 202 can be operated to pack and/or eject the refuse. In some implementations, the auger is turned as the refuse is released from refuse holder 204 to pack the refuse as it is released from the refuse holder.

Figure 9:
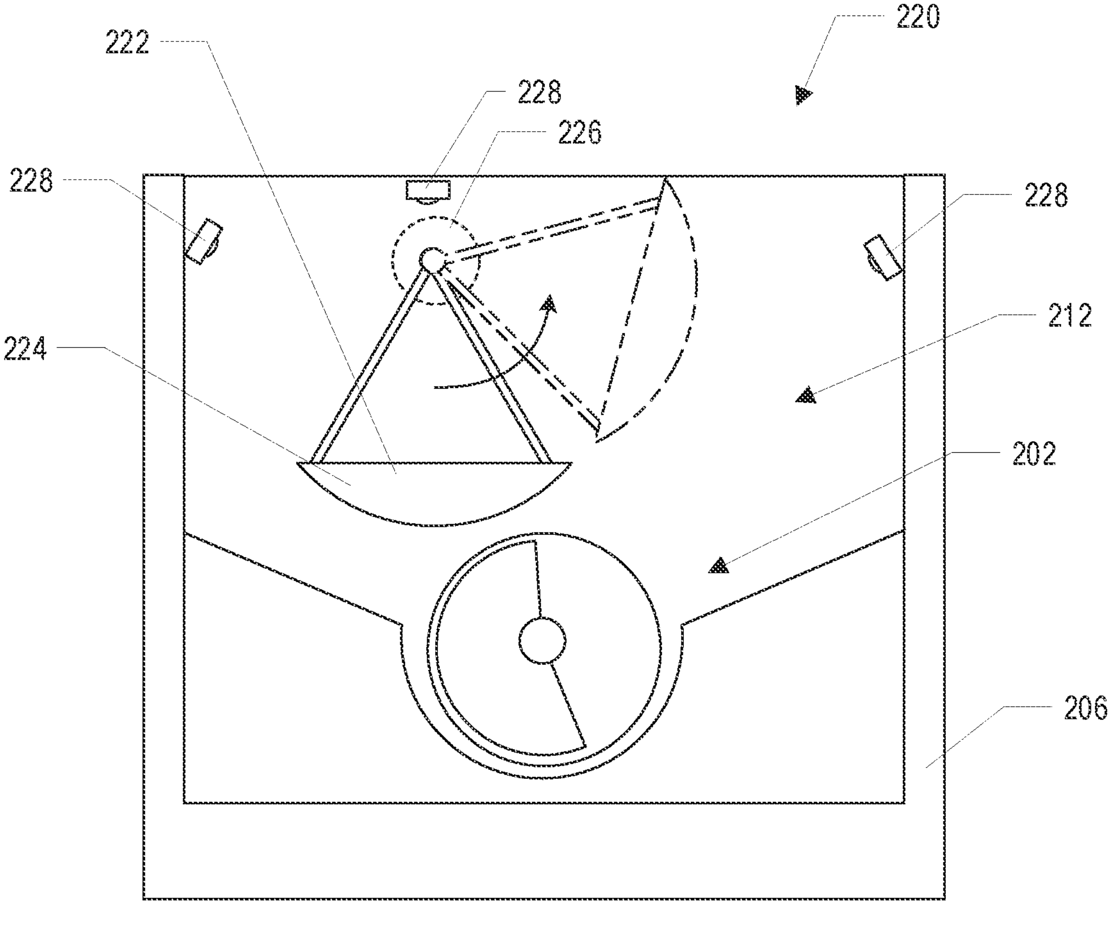
FIG. 9 is a rear schematic view of an alternate implementation of a curved surface refuse support panel that releases refuse to an auger packer system, according to implementations of the present disclosure.

FIG. 9 is a schematic rear cutaway view of an alternate implementation of a curved surface refuse support panel that releases refuse to an auger packer system. Vehicle 220 includes a body 206, a hopper 212, an auger system 202, a refuse holder 224, a rotary actuator 226, and sensors 228. Refuse holder 224 is mounted above auger system 202. In this example, the upper surface of refuse holder 224 has a concave shape. The upper surface of refuse holder 224 forms a curved refuse support panel 222 on which refuse can be deposited.

Rotary actuator 226 is mounted on body 206. Rotary actuator 226 can be coupled to a control system, such as described herein relative to FIG. 22. Rotary actuator 226 can be operated to rotate refuse holder 224 in either direction. In some cases, refuse holder 224 may be centered by gravity to rest in the centered position shown in solid lines in FIG. 9.

After refuse has been deposited in refuse holder 224, sensors 228 can be operated to capture images of refuse on the refuse support panel 232. Once images and/or other sensor data of the refuse have been captured, rotary actuator 226 can be operated to rotate refuse holder 224 in the direction of the arrow to the position shown as phantom lines in shown in FIG. 9, such that refuse on refuse support panel 222 is released into auger system 202. Auger system 202 can be operated to pack and/or eject the refuse. In some implementations, the auger is already turning when the refuse is released from refuse holder 224 to pack the refuse as it is released from the refuse holder.

In some implementations described above, the system includes a single refuse support panel. In some implementations, a refuse inspection system includes two or more refuse support panels. Refuse support panels can be actuated to release refuse simultaneously or at different times. Refuse support panels can be actuated in coordination with one another or independently from one another.

Figure 10:
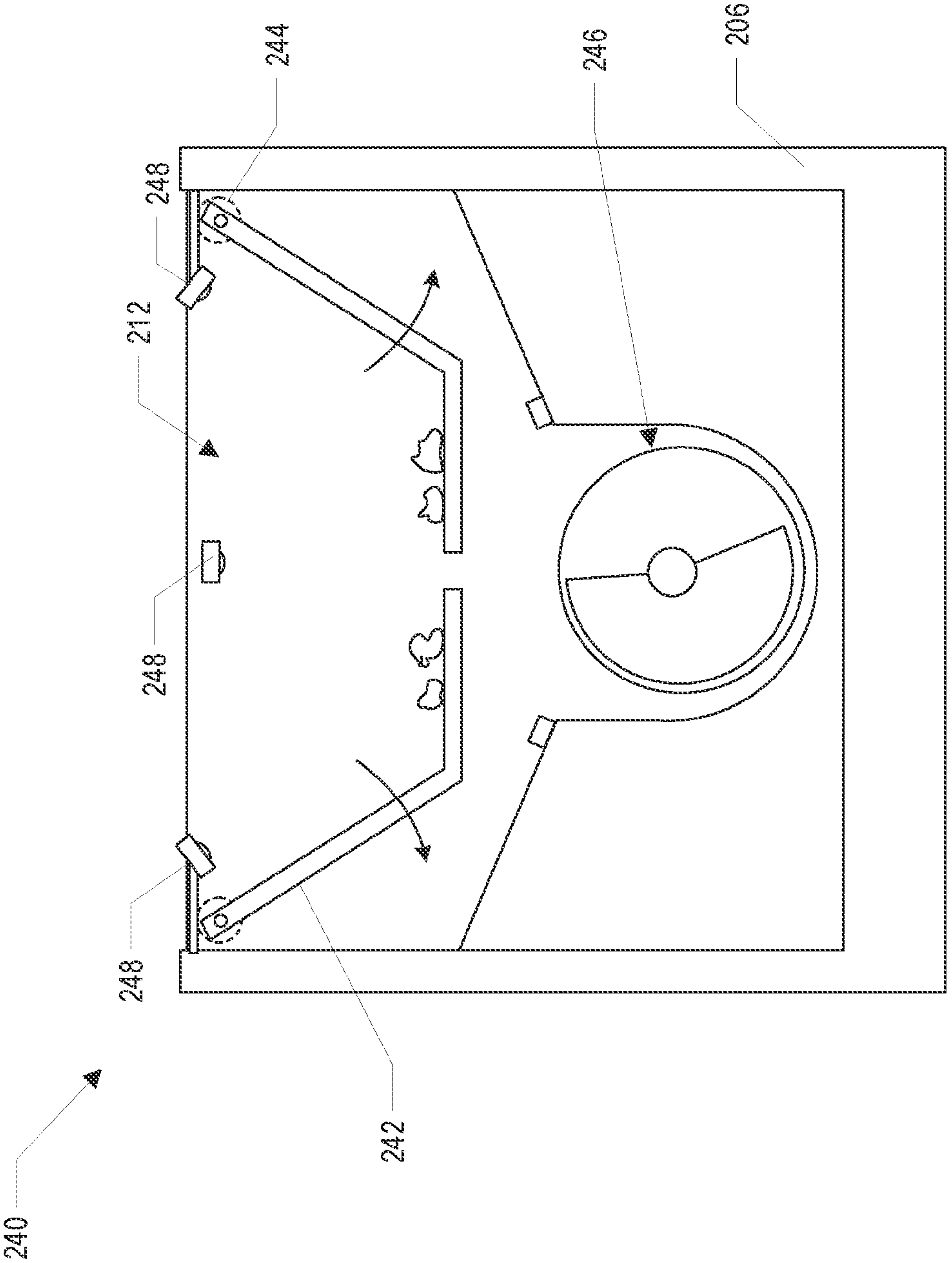
FIG. 10 is a rear schematic view of a complementary pair refuse support panels that release refuse to an auger packer system, according to implementations of the present disclosure.

FIG. 10 is a schematic rear cutaway view of a complementary pair of refuse support panels that release refuse to an auger packer system. Vehicle 240 includes body 206, hopper 212, refuse support panels 242, refuse support panel actuators 244, auger system 246, and sensors 248. The position of refuse support panels 242 can be controlled by operating refuse support panel actuators 244.

Initially, refuse support panels 242 maybe positioned to have aligned horizontal interior surfaces, such as shown in FIG. 10. After refuse has been deposited in refuse holder 204, sensors 248 can be operated to capture sensor data of refuse on refuse support panels 242. Once images and/or other sensor data of the refuse have been captured, rotary actuators 244 can be operated to swing refuse support panels 242 away from one another in the direction of the arrows shown in FIG. 10, such that refuse on refuse support panel 242 is released into auger system 246. Auger system 246 can be operated to pack and/or eject the refuse. In some implementations, the auger is already turning when the refuse is released from refuse support panels 242 to pack the refuse as it is released from the refuse support panels.

FIGS. 11-14 illustrate a refuse collection vehicle with a refuse support panel that releases refuse to an auger packer system. In this example, the auger screw is offset from the center of the vehicle.

Figure 11:
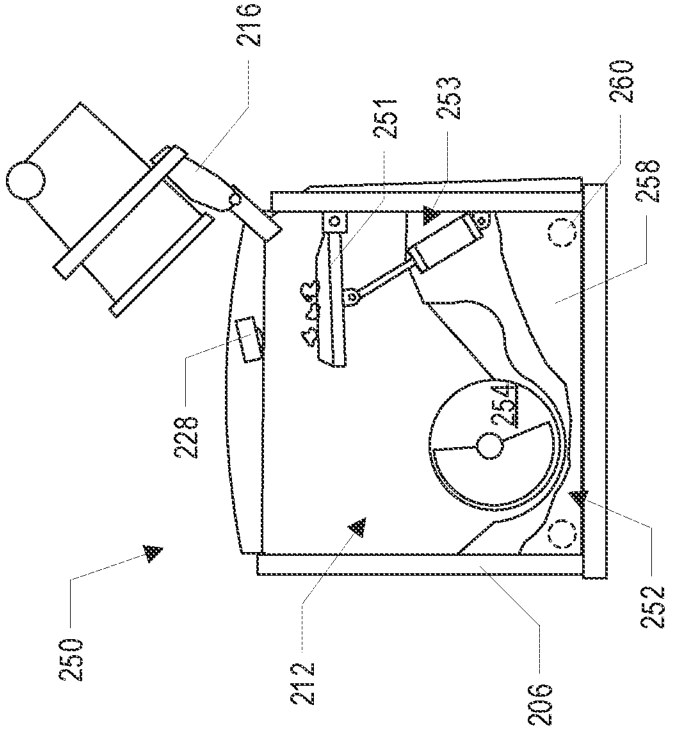
FIG. 11 is a schematic rear view illustrating a refuse inspection panel in a raised position, according to implementations of the present disclosure.

FIG. 11 is a schematic rear cutaway view illustrating a refuse support panel in a raised position. Vehicle 250 includes body 206, hopper 212, refuse support panel 251, refuse support panel actuator system 253, camera 228, and collection arm 216. Vehicle 250 also includes a packer system 252 including auger screw 254, ejector 258, and ejector actuators 260. In FIG. 11, ejector 258 is cut away for illustrative purposes to show the components in hopper 112.

Refuse support panel actuator system 253 can include one or more actuators that can be operated to change the inclination of refuse support panel 251. In one example, refuse support panel actuator system 226 includes an electric linear actuator.

In one example, auger motor 256 is a motor and ejector actuators 260 are electric linear actuators. Auger screw 254, ejector actuators 260, and support panel actuator system 253 can be connected to a control system. Container collection arm 216 can be operated to dump refuse from a container onto refuse support panel 124.

Figure 12:
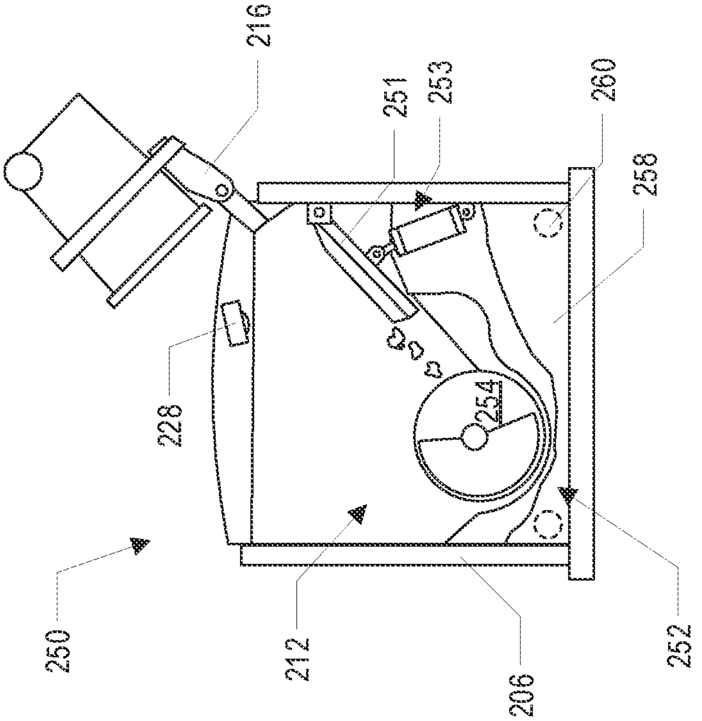
FIG. 12 is a schematic rear view illustrating a refuse inspection panel in a lowered position, according to implementations of the present disclosure.

Referring to FIG. 12, refuse support panel actuator system 253 can be operated to tip refuse support panel 251 downward to release refuse into to the adjacent sloping sidewall of hopper 212 and/or onto the auger screw 254. Packer system 252 can be operated to pack and/or eject the refuse. In some implementations, auger screw 254 is already turning when the refuse is released from refuse support panel 251 to pack the refuse as it is released from the refuse support panel. In some implementations, ejector actuators 260 are used to advance ejector 258 toward the rear of vehicle 250 to further compact and/or eject the refuse.

Figure 13:
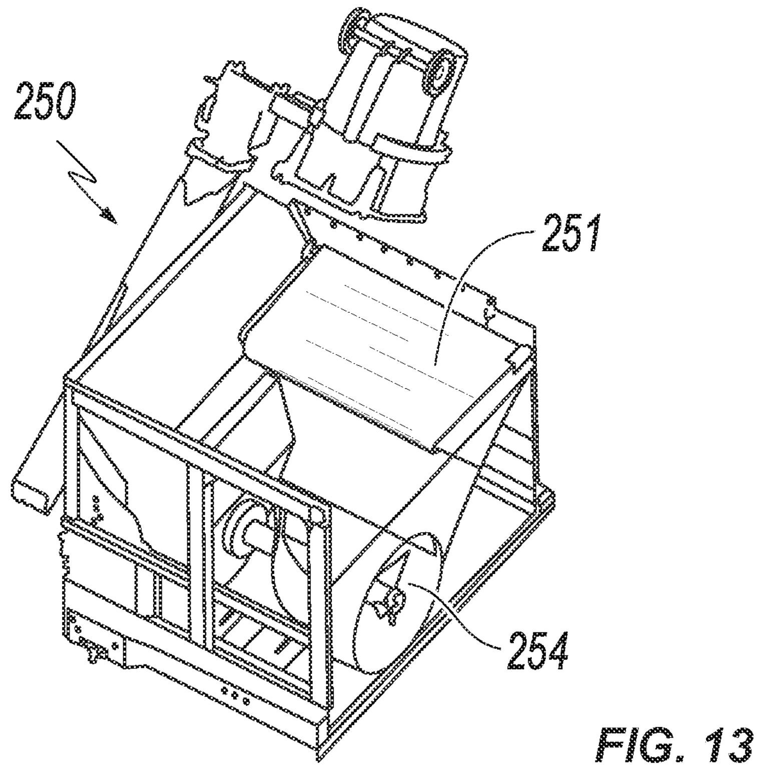
FIG. 13 is a perspective view from above illustrating a refuse inspection panel in a raised position, according to implementations of the present disclosure.
Figure 14:
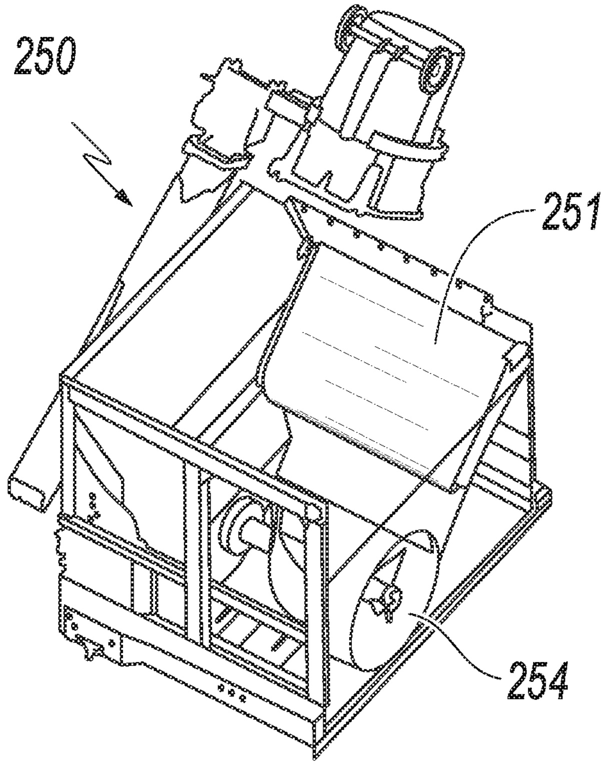
FIG. 14 is a perspective from above illustrating a refuse inspection panel in a lowered position, according to implementations of the present disclosure.

FIG. 13 is a perspective view from above illustrating refuse support panel 251 of vehicle 250 in a raised position above auger screw 254. FIG. 14 is a perspective view from above illustrating a refuse support panel 251 of vehicle 250 in a lowered position such that refuse can be released to auger screw 254. In FIGS. 13 and 14, ejector 258 and ejector actuators 260 are omitted for illustrative purposes.

Figure 15:
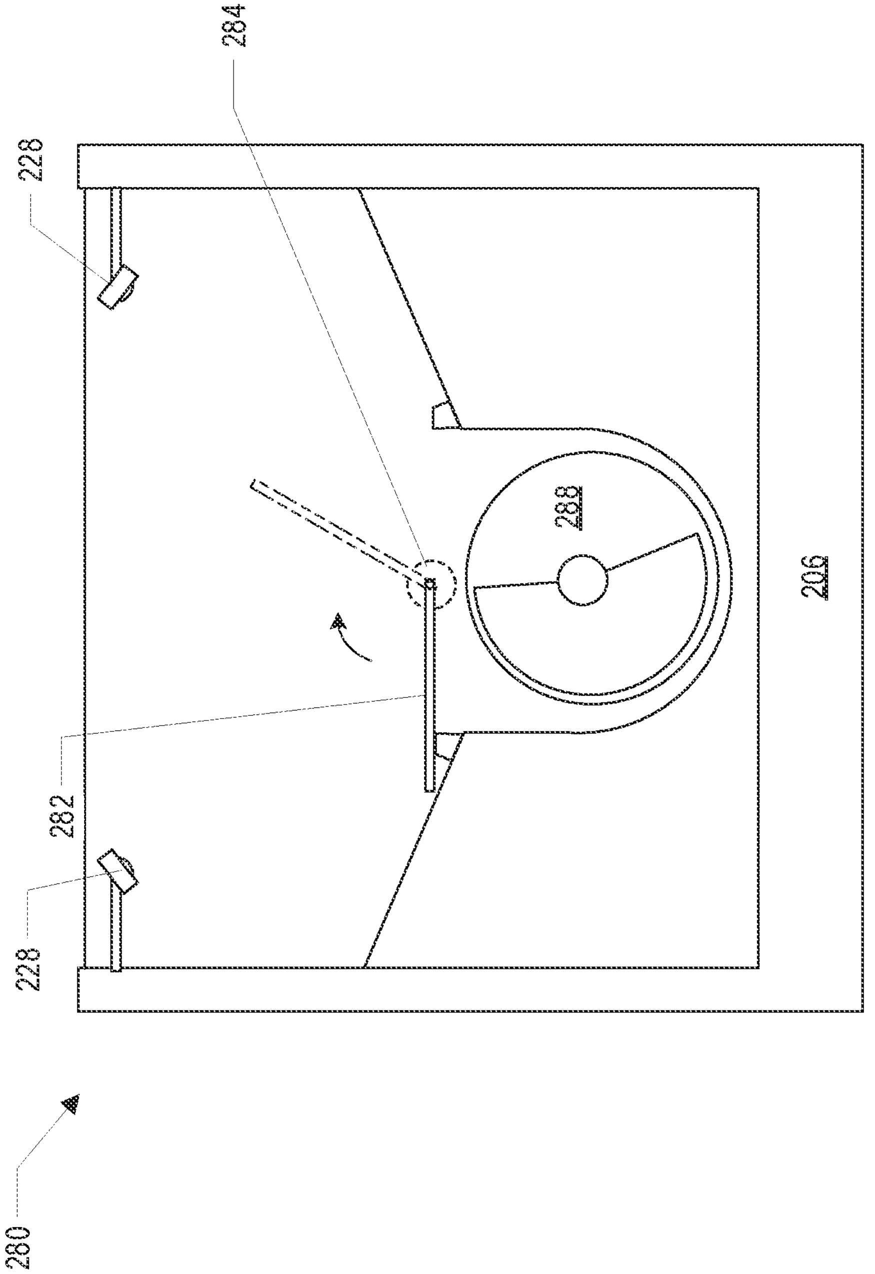
FIG. 15 is a schematic rear view of a vehicle including panel that can be flipped to alternate positions over an auger packer system, according to implementations of the present disclosure.

FIG. 15 is a schematic rear cutaway view of a vehicle including panel that can be flipped to alternate positions over an auger packer system. Vehicle 280 includes refuse support panel 282 and rotary actuator 284. Rotary actuator 284 can be mounted to body 206 at a location that is centered over auger screw 288. Rotary actuator 284 can be operated to flip refuse support panel 282 from one side of auger screw 288 to the other. In this manner, refuse can be alternately deposited and released on either side of refuse support panel 282. In either case, cameras 228 can image refuse before the refuse is released to the auger screw.

Figure 16:
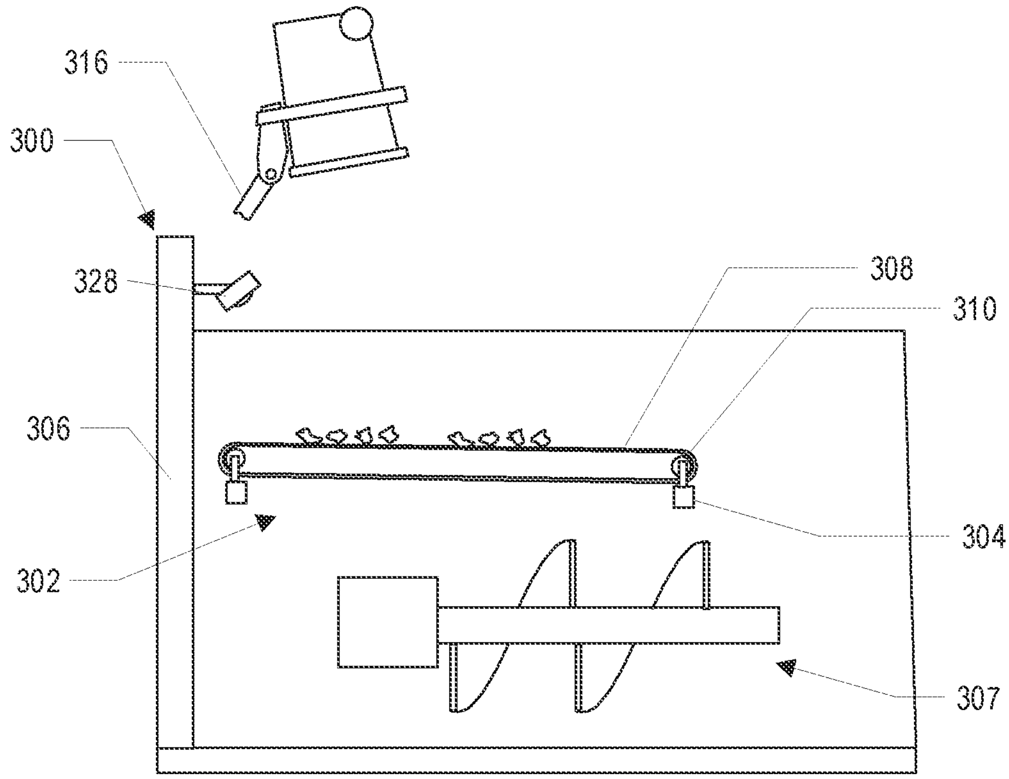
FIG. 16 is a schematic side view of a rail-mounted conveyor belt inspection panel that releases refuse to an auger packer system.
Figure 17:
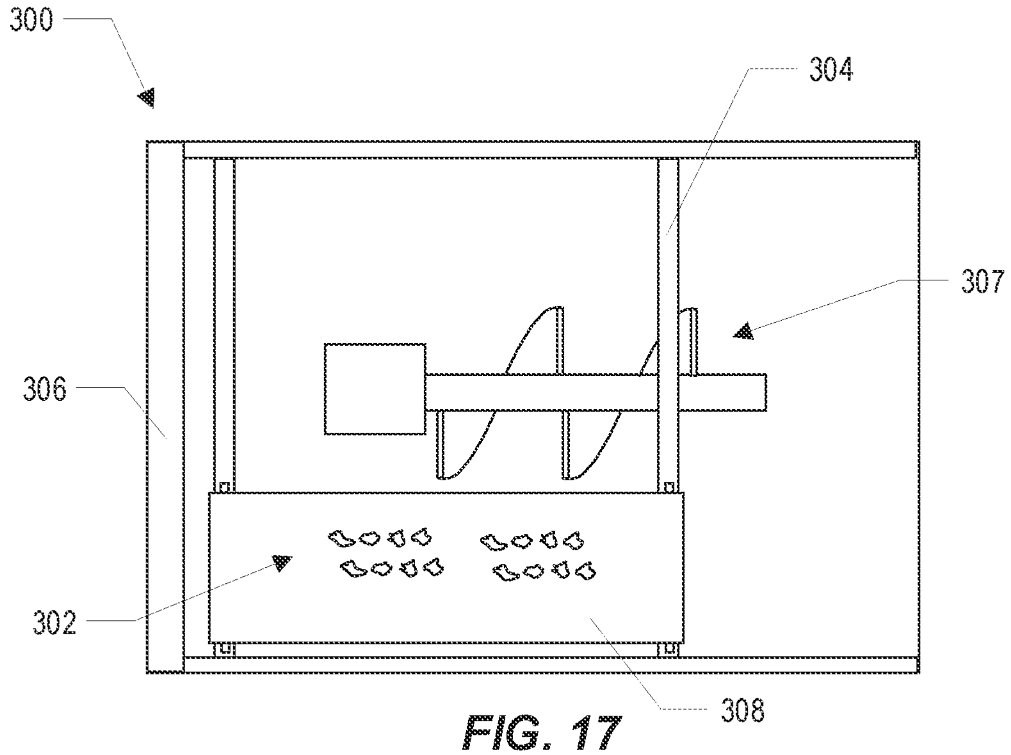
FIG. 17 is a schematic top view of the rail-mounted conveyor belt inspection panel illustrated in FIG. 16.

FIG. 16 is a schematic side cutaway view of a rail-mounted conveyor belt inspection panel that releases refuse to an auger packer system. FIG. 17 is a schematic top view of the rail-mounted conveyor belt inspection panel illustrated in FIG. 16. Vehicle 300 includes conveyor belt system 302, conveyor belt rail system 304, body 306, and auger system 307. Conveyor belt system 302 includes conveyor belt 308 and rollers 310. Conveyor belt system 302 can be motor driven. The motor can be coupled to a control system.

Refuse can be dumped by container collection arm 316 onto conveyor belt 308. In some implementations, different sections of the conveyor belt can be different colors. Sensors 328 can be used to capture sensor data of the refuse while it is on conveyor belt 308. The different colors may provide a background for images taken of the refuse on the conveyor belt for use in detecting contamination or other characteristics of the refuse. The colors can also be used by the system as reference points for the location of particular items of refuse on the conveyor belt.

As conveyor belt 308 continues to operate, refuse falls into auger system 307. Auger system 307 can be operated to pack and/or eject the refuse. In some implementations, the auger is already turning when the refuse is released from conveyor belt 308 to pack the refuse as it is released from the conveyor belt.

Conveyor belt system 302 can be translated from side to side of body 306 on conveyor belt rail system 304.

Figure 18:
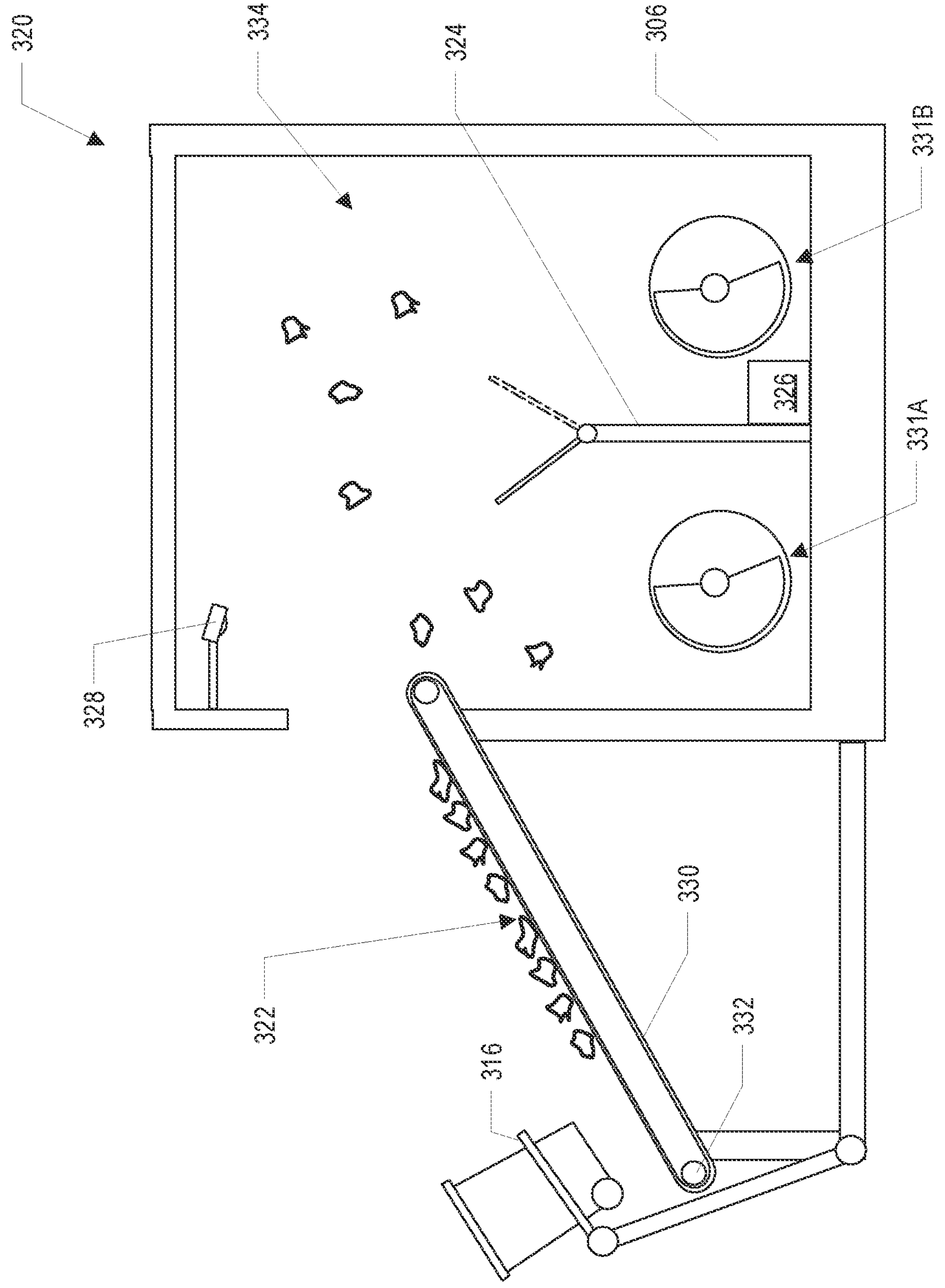
FIG. 18 is a schematic rear view of a vehicle illustrating a refuse inspection system having a conveyor belt inspection panel and air gun diversion system.

FIG. 18 is a schematic rear view of a vehicle illustrating a refuse inspection system having a conveyor belt inspection panel and air gun diversion system. Vehicle 320 includes body 306, conveyor belt system 322, air gun 324, control system 326, auger systems 331A and 331B, sensor 328, and container collection arm 316. Control system 326 can be coupled to air gun 324, auger systems 331A and 331B, and sensor 328.

Conveyor belt system 322 can translate in and out with container collection arm 316 with respect to body 306. Conveyor belt system 322 includes conveyor belt 330 and rollers 332. Conveyor belt system 322 can be motor driven. The motor can be coupled to control system 326.

In operation, container collection arm 316 can dump refuse from containers onto conveyor belt 330. Refuse can travel up conveyor belt 330. While refuse is on conveyor belt 330, sensor 328 can be operated to capture images and/or sensor data of the refuse.

As conveyor belt 330 continues to move, the refuse is released into compartment 334 of vehicle 320. As is further described herein, image data and sensor data can be used to detect contamination and/or other characteristics of the refuse as it travels up the conveyor belt. The system can use image data and sensor data and control air gun 324 to divert refuse entering the compartment. By diverting different types of refuse in a different manner, air gun can be used to sort or separate refuse entering the compartment. For example, the air gun may propel lighter objects of refuse such that they fall into auger system 331B, while heavier objects fall onto auger system 331A. In other implementations, only some of the sorted objects are released to the auger system, while others are diverted to container for recycling, manually sorting, or other disposition.

In the system described above relative to FIG. 18, an air gun is used to separate some items or portions of refuse that has been collected in the RCV from other items or portions of the refuse. Many other devices and systems can be used to separate or sort refuse based on images or sensor data of refuse collected on an RCV. Examples of devices that can be used in various implementations include robotic arms, screens, scrapers, paddles, hooks, sweeper bars, magnets, and vacuum devices.

Figure 19:
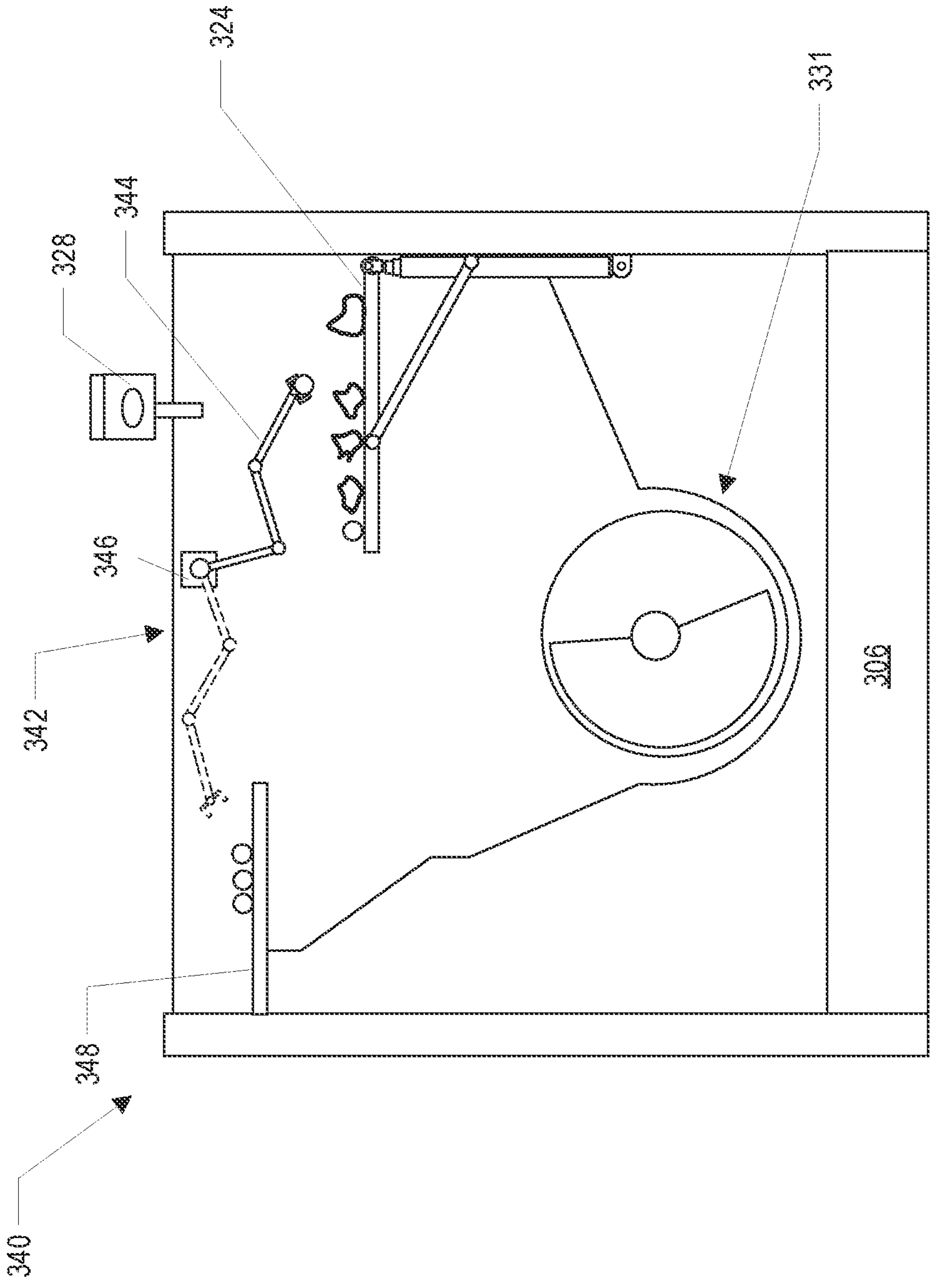
FIG. 19 is a schematic rear view of vehicle including a robotic arm that can pick refuse items for a refuse support panel.

Referring to FIG. 19, vehicle 340 includes robotic system 342 including robotic arm 344 and control unit 346. Control unit 346 is coupled to robotic arm 344. Control unit 346 may use image or sensor data captured by sensor 328 or other devices to control robotic arm 344. Robotic arm 344 may be used to remove selected items from refuse support panel 324. In the example shown in FIG. 19, items picked from refuse support panel 324 may be placed on a platform 348. In other implementations, items or material removed from a refuse support panel can be placed in a container, packed, crushed, recycled, or ejected from the vehicle. In some implementations, items can be treated. Examples of treatments include heat, light, radiation, disinfectants, chemicals, or forced air.

Figure 20C:
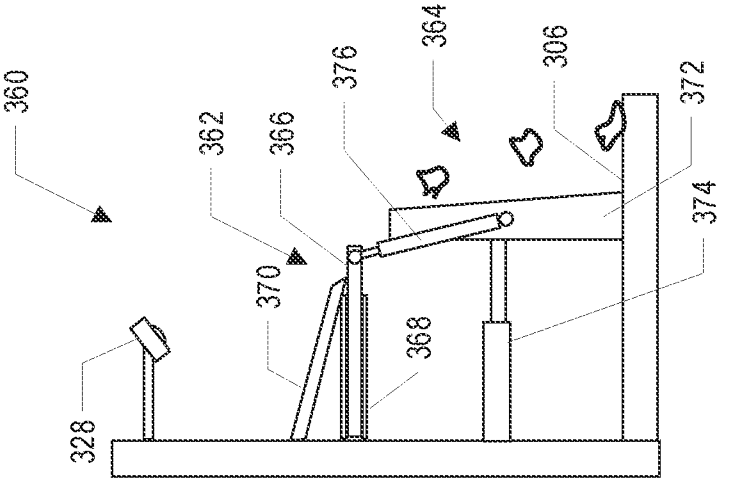
FIGS. 20A through 20C illustrate a vehicle having a refuse inspection panel that is linked to a plate ejector system.
Figure 20B:
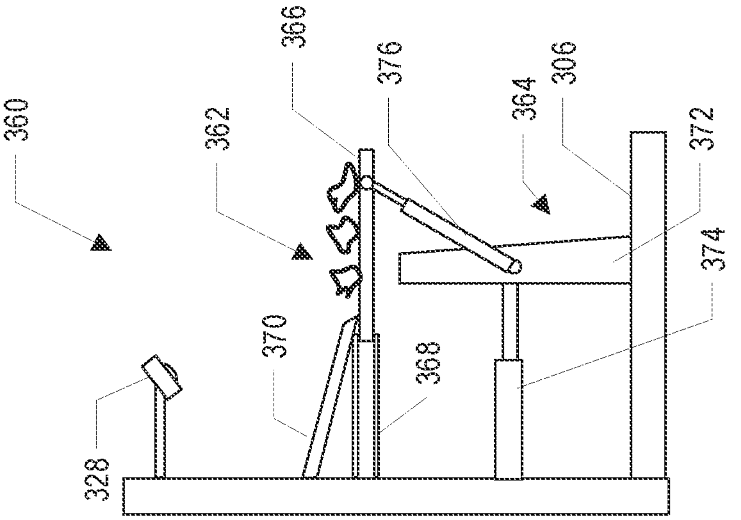
Figure 20A:
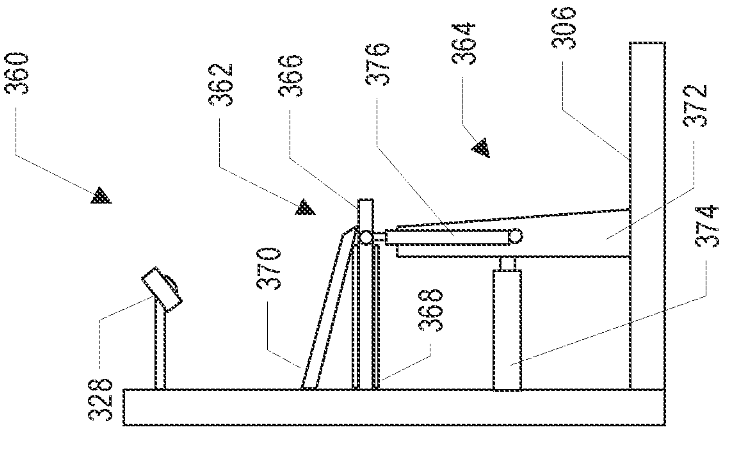

In certain implementations, a refuse inspection panel can be mechanically linked to a packer system. FIGS. 20A through 20C illustrate a vehicle having a refuse inspection panel that is linked to a plate ejector system. Vehicle 360 includes body 306, refuse inspection system 362, and packer system 364. Refuse inspection system 362 includes refuse support panel 366, guide rails 368, scraper ramp 370, and sensor 328. Refuse support panel 366 can slide forward and back on guide rails 368. Scraper ramp 370 and guide rails 368 are attached to body 306.

Packer system 364 includes ejector panel 372 and ejector actuator 374. Ejector actuator 374 can be operated to advance ejector panel 372 (to the right in FIG. 20A through 20C) to pack and eject refuse from vehicle 360.

Refuse support panel 366 is connected to ejector panel 372 by way of linking actuator 376. Linking actuator 376 is, in one example, an electric linear actuator. In operation, one or both of linking actuator 376 and ejector actuator 374 can be operated to advance refuse support panel 366 from under scraper ramp 370 so that refuse can be deposited on the top surface of refuse support panel 366 (See FIG. 20B).

Initially, refuse may be dropped from a container onto scraper ramp 370 and/or directly onto refuse support panel 366. Once images and sensor data of the refuse on refuse support panel 366 have been captured, one or both of linking actuator 376 and ejector actuator 374 can be operated to at least partially retract refuse support panel 366. As refuse support panel 366 is retracted, at least some of the refuse is scraped off of refuse support panel 366 by the leading edge of scraper ramp 370 such that the refuse falls into the path of ejector panel 372 (See FIG. 20C). Packer system 364 can be operated to pack the refuse that has been released from refuse support panel 366.

In examples described above, an RCV has been configured to include a mechanism and/or structure that functions to hold the refuse in a substantially stationary state after the refuse has been emptied from the container and prior to the refuse entering the hopper and/or other structure that is to hold the refuse for transport by the RCV. Other structures and/or mechanisms can also be employed. The RCV can be configured to include a ledge, surface, ramp, and so forth to hold the refuse in a stationary position, or in at least a sufficiently stationary state to enable accurate image(s) and/or other contaminant sensor data to be captured for analysis. In some examples, the structure and/or mechanism is also configured to spread, distribute, or otherwise rearrange the refuse for optimal dispersion, to provide for optimal image and/or contaminant sensor data capture for analysis. Some examples of systems that can be employed in various implementations, including vanes, roll-up doors, and conveyor belts, are described in U.S. patent application Ser. No. 16/523,903 filed Jul. 26, 2019, entitled "Refuse Contamination Analysis", (the "'903 application"), which is incorporated by reference in its entirety.

Although examples herein may show and/or describe implementations for particular types of RCVs, implementations are not limited to these examples. The structures and/or methods described herein can apply to any suitable type of RCV, including front-loader, rear-loader, side-loader, roll-off, and so forth, with or without intermediate collection device, carry can, and so forth.

Figure 21A:
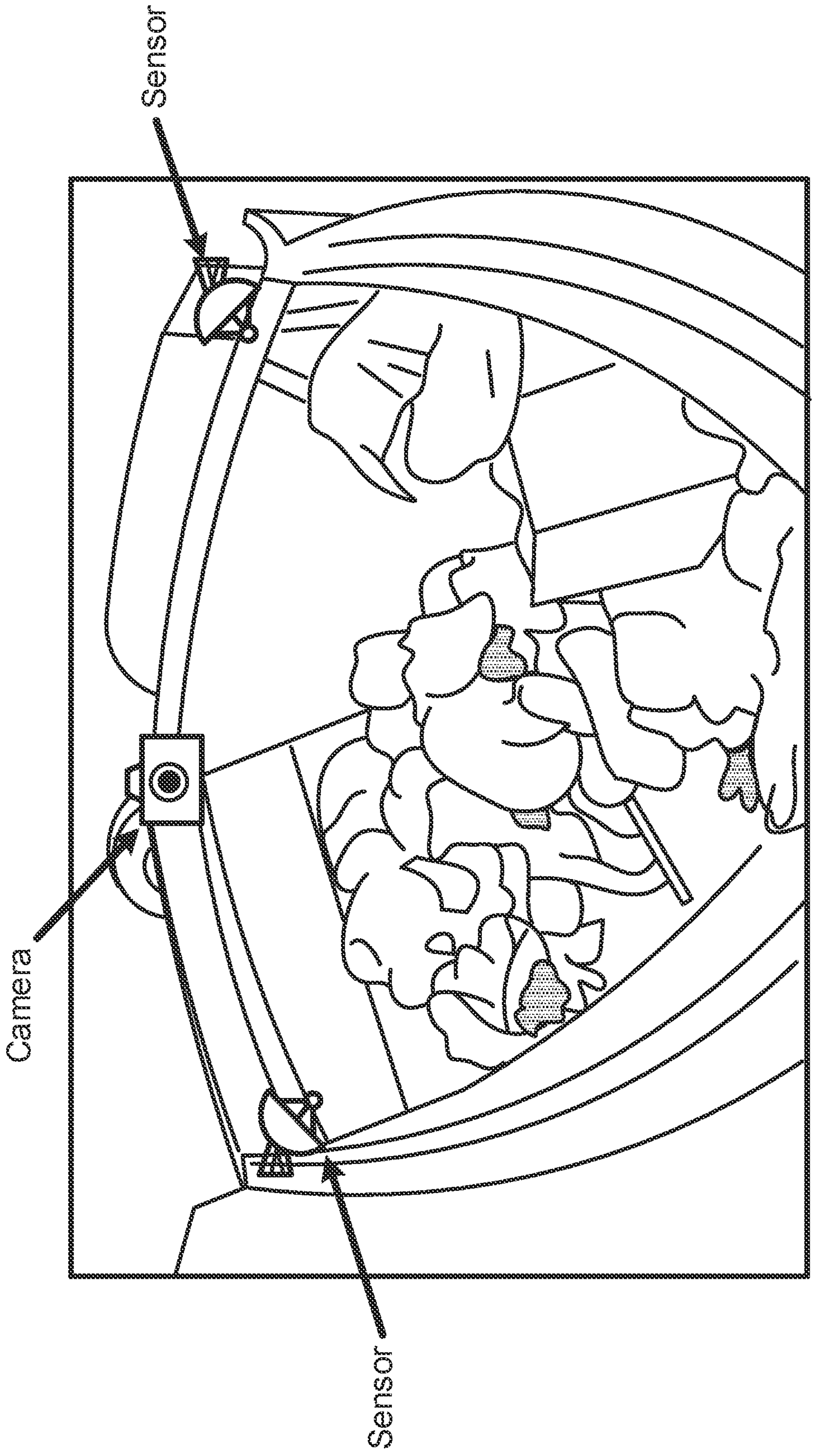
FIG. 21A depicts an example of camera and/or other sensor placement in an RCV, according to implementations of the present disclosure.

FIG. 21A depicts an example of contaminant sensor (e.g., camera) placement in an RCV, according to implementations of the present disclosure. As shown, the camera(s) and/or other sensor(s) can be placed with a view towards refuse, such as refuse in a hopper of the RCV. Any suitable number of camera(s) and/or other sensor(s) can be employed. A combination of cameras and/or sensors may monitor the waste as it is being dumped into the hopper or after it has been dumped, to identify contamination as the refuse falls and/or settles into the hopper (e.g., prior to be compacted).

Figure 21B:
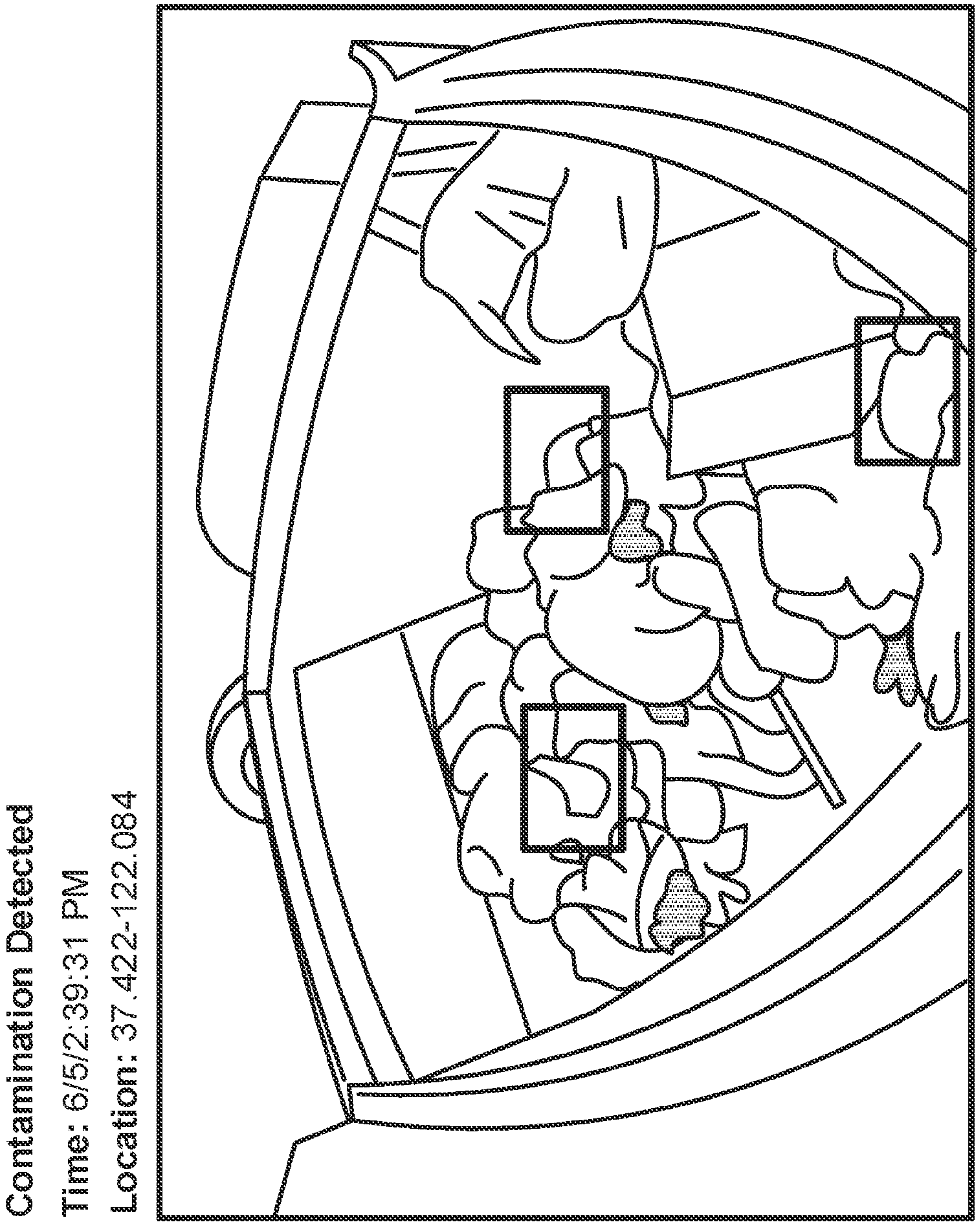
FIG. 21B depicts an example of identified contamination, according to implementations of the present disclosure.

FIG. 21B depicts an example of identified contamination, according to implementations of the present disclosure. When contamination is detected, the system can save image(s) and/or video of the event including marked instances of contaminants (e.g., the squares overlaying the image in this example). The marked image(s) and/or video data can be sent to the cloud for storage and review.

Figure 22:
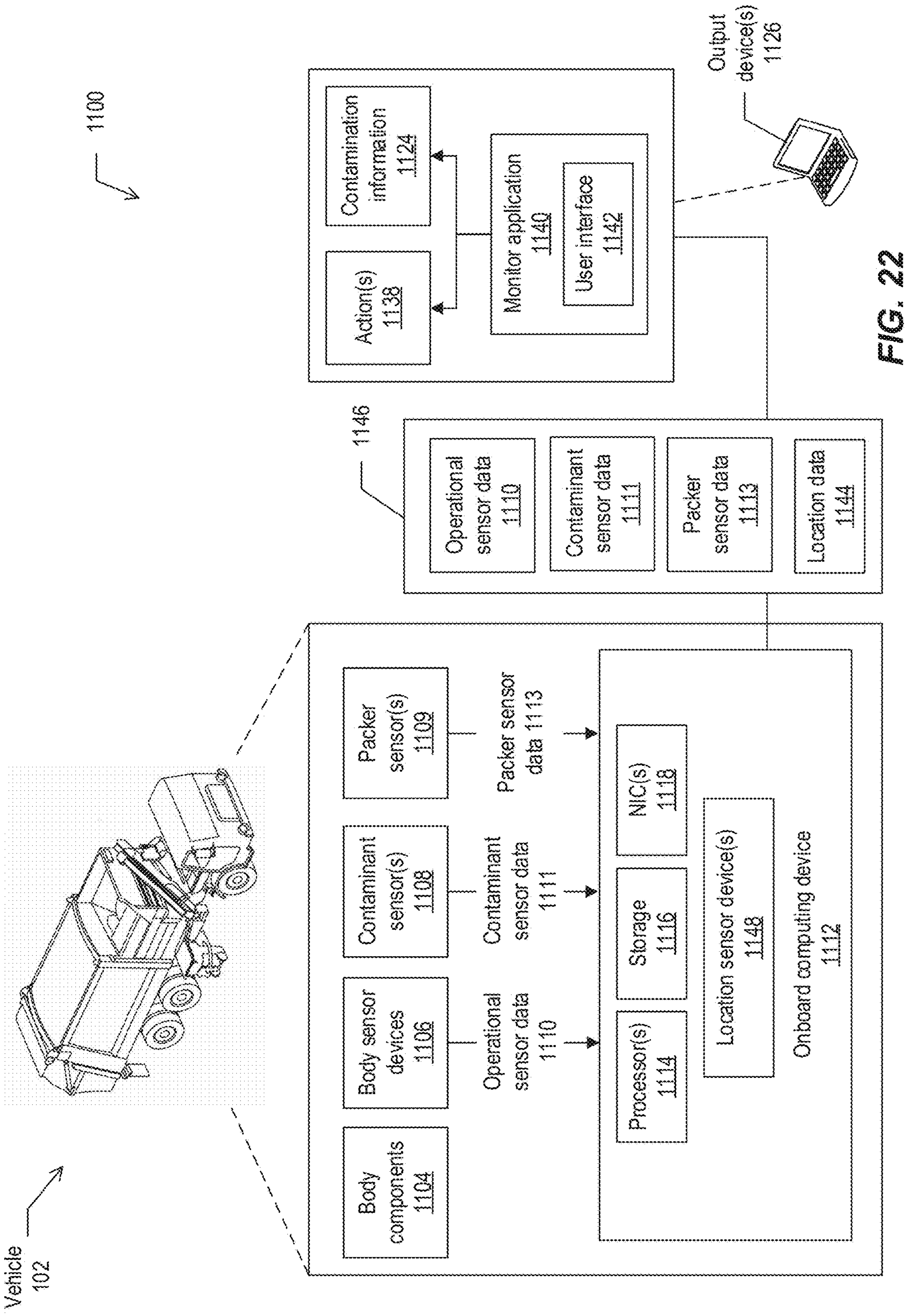
FIG. 22 depicts an example system for identifying refuse contamination and/or other issue(s), and subsequent packing, sorting, and disposal or other actions, according to implementations of the present disclosure.

FIG. 22 depicts an example system for identifying refuse contamination and/or other issue(s), and subsequent packing, sorting, and disposal or other actions, according to implementations of the present disclosure. A vehicle 102 can include any suitable number of body components 1104. The vehicle 102 can be an RCV that operates to collect and transport refuse (e.g., garbage). The refuse collection vehicle can also be described as a garbage collection vehicle, or garbage truck. The vehicle 102 can be configured to lift containers that contain refuse, and empty the refuse in the containers into a hopper of the vehicle 102 and/or intermediate collection device conveyed by the RCV, to enable transport of the refuse to a collection site, compacting of the refuse, and/or other refuse handling activities. The vehicle 102 can also handle containers in other ways, such as by transporting the containers to another site for emptying.

The body components 1104 can include various components that are appropriate for the particular type of vehicle 102. For example, a garbage collection vehicle may be a truck with an automated side loader (ASL). Alternatively, the vehicle may be a front-loading truck, a rear loading truck, a roll off truck, or some other type of garbage collection vehicle. A vehicle with an ASL may include body components involved in the operation of the ASL, such as arms and/or a fork, as well as other body components such as a pump, a tailgate, a packer, and so forth. A front-loading vehicle can include body components such as a pump, tailgate, packer, grabber, and so forth. A rear loading vehicle may include body components such as a pump, blade, tipper, and so forth. A roll off vehicle may include body components such as a pump, hoist, cable, and so forth. Body components may also include other types of components that operate to bring garbage into a hopper (or other storage area) of a truck, compress and/or arrange the garbage in the hopper, and/or expel the garbage from the hopper.

The vehicle 102 can include any number of body sensor devices 1106 that sense body component(s), and generate operational sensor data 1110 describing the operation(s) and/or the operational state of various body components 1104. The body sensor devices 1106 are also referred to as operational sensor devices, or operational sensors. Operational sensors may be arranged in the body components, or in proximity to the body components, to monitor the operations of the body components. The operational sensors may emit signals that include the operational sensor data 1110 describing the body component operations, and the signals may vary appropriately based on the particular body component being monitored. In some implementations, the operational sensor data 1110 is analyzed, by a computing device on the vehicle and/or by remote computing device(s), to identify the presence of a triggering condition based at least partly on the operational state of one or more body components, as described further below.

In some implementations, one or more contaminant sensors 1108 can be mounted on the vehicle 102 or otherwise present on or in the vehicle 102. The contaminant sensor(s) 1108 can each generate contaminant sensor data 1111 that includes one or more images of a scene external to and in proximity to the vehicle 102 and/or image(s) of an interior of the vehicle 102. For example, contaminant sensor(s) 1108 can be mounted to capture image(s) of refuse before, during, and/or after the emptying of refuse into the hopper of the vehicle, a intermediate collection device, and/or other receptacle. In some implementations, one or more contaminant sensors 1134 are arranged to capture image(s) of a container before, after, and/or during the operations of body components 1104 to empty the container into the hopper of the vehicle 102. For example, for a front-loading vehicle, the contaminant sensor(s) 1108 can be arranged to image objects in front of the vehicle. As another example, for a side loading vehicle, the contaminant sensor(s) 1134 can be arranged to image objects to the side of the vehicle, such as a side that mounts the ASL to lift containers.

Control system 1100 can include any number of packer sensors 1109 that sense loads, position, angle, or other characteristics of the packer system or its components. The packer sensor(s) 1109 can each generate packer sensor data 1113. The packer sensors may provide data during compaction, ejection, when the system is idle or shut down, or any other mode of operation. In some cases, sensors are used to obtain data about the operation of the drive system. Information from the sensors can be used to control motion of the auger screw or the ejector. For example, speed or acceleration of an ejector may be controlled based on loads encountered during packing, ejecting, or retracting.

In some implementations, the operational sensor data, contaminant sensor data, and/or packer sensor data may be communicated from the body sensors and the contaminant sensors, respectively, to an onboard computing device 1112 in the vehicle 102. In some instances, the onboard computing device is an under-dash device (UDU), and may also be referred to as the Gateway. Alternatively, the device 1112 may be placed in some other suitable location in or on the vehicle. The sensor data and/or image data may be communicated from the sensors and/or camera, to the onboard computing device 1112, over a wired connection (e.g., an internal bus) and/or over a wireless connection. In some implementations, a J1939 bus connects the various sensors and/or cameras with the onboard computing device. In some implementations, the sensors and/or cameras may be incorporated into the various body components. Alternatively, the sensors and/or cameras may be separate from the body components. In some implementations, the sensors and/or cameras digitize the signals that communicate the sensor data and/or image data, before sending the signals to the onboard computing device, if the signals are not already in a digital format.

The onboard computing device 1112 can include one or more processors 1114 that provide computing capacity, data storage 1116 of any suitable size and format, and network interface controller(s) 1118 that facilitate communication of the device 1112 with other device(s) over one or more wired or wireless networks.

In some implementations, the analysis of the operational sensor data 1110, contaminant sensor data 1111, and/or packer sensor data 1113 is performed at least partly by the onboard computing device 1112, e.g., by processes that execute on the processor(s) 1114. For example, the onboard computing device 1112 may execute processes that perform an analysis of the sensor data 1110 to detect the presence of a triggering condition (for example, a lift arm being in a particular position in its cycle to empty a container into the hopper of the vehicle, or other state of operation or conditions). On detecting the triggering condition, the device 1112 can transmit one or more signals 1146 to analysis computing device(s) 1120, where such signal(s) 1146 can include the contaminant sensor data 1128, e.g., including one or more images of the refuse that were captured during a time period proximal to when the container was emptied. In some implementations, the onboard computing device 1112 transmits signal(s) 1146 that include at least a portion of the operational sensor data 110 and/or contaminant sensor data 1128 to the analysis computing device(s) 1120, and analysis module(s) executing on the device(s) 1120 can analyze the sensor data 1110 to detect the presence of a triggering condition.

In some instances, a triggering condition may also be based at least partly on a location of the vehicle 102, as determined through a satellite-based navigation system such as the global positioning system (GPS), or through other techniques. In such instances, the onboard computing device 1112 can include location sensor device(s) 1148, such as GPS receivers or other types of sensors that enable location determination. The location sensor(s) can generate location data 1144 that describes a current location of the vehicle 102 at one or more times. The location data 1144 can be used, alone or in conjunction with the sensor data 1110, to determine the presence of a triggering condition. For example, a triggering condition can be present when the location of the vehicle 102 is at, or within a threshold distance of, a previously determined and stored location of a container to be emptied. Accordingly, the location data and sensor data can be analyzed, on the device 1112 and/or the device(s) 1120, to determine the presence of a triggering condition. The data analysis of the operational sensor data 1110, contaminant sensor data 1111, and/or packer sensor data 1113, on the device 1112, the analysis device(s) 1120, or elsewhere, can be performed in real time with respect to the generation of the sensor data, image data, and/or location data. Alternatively, the analysis can be performed periodically (e.g., in a batch analysis process), such as once a day and/or at the end of a particular vehicle's refuse collection route. In these examples, the image(s) and/or sensor data analyzed may include those image(s) and/or sensor data captured at a time that is a predetermined offset from the triggering condition, such as 5 seconds after the completion of a cycle to empty a container in the hopper and/or intermediate collection device of an RCV.

In some implementations, the signal(s) 1146 (possibly including the operational sensor data 1110, contaminant sensor data 1111, packer sensor data 1113, location data 1144, and/or other information) are sent to an analysis computing device(s), and analysis module(s) executing on the device(s) analyze the data to determine whether any contamination is present in the refuse handled by the vehicle 102. Such analysis can include determining whether a triggering condition is present, analyzing image(s) and/or sensor data of the refuse that are captured at a time that is proximal to the triggering condition, and based on the image analysis, identifying instances in which the refuse exhibits contamination. In some implementations, the analysis module(s) can include a ML engine, which can also be described as a classifier, a model, an image classifier, or an image classification engine. The engine can be trained, using any suitable ML technique, to identify images and/or sensor data that show contamination or lack of contamination. ML aspects are described further herein For example, the engine can be trained to look for various pattern(s) and/or feature(s) within image(s) and/or sensor data that indicate the presence, or absence, of contamination, such as spectral patterns that indicate contamination, particular recognized objects that are contaminants, weight data indicating possible contamination, and so forth. In some implementations, the engine can be trained based on a (e.g., large) data set of images and/or sensor data that have been tagged as exhibiting or not exhibiting contamination, e.g., by an operator reviewing the image(s) and/or sensor data. In some implementations, the contamination (or absence of contamination) designations that are made by the operator through the monitor application, as described further below, can be used as training data for further train or otherwise refine the operations of the engine.

Contamination information 1124, describing instances of refuse collection that have been determined to show contamination at the time of their collection, can be communicated to one or more output computing devices 1126 for presentation to various users. In some instances, the contamination information 1124 can be communicated as a notification, alert, warning, and/or other type of message to inform user(s) of the presence of contamination in one or more containers of interest. For example, an owner of the container, user of the container, or some other individual responsible for the container can be notified of the contamination. In some implementations, one or more actions 1138 can be performed based on the determination of contamination. Such action(s) 1138 can include sending the notification(s) including the contamination information 1124 as described above. Action(s) 1138 can also include billing a responsible party to charge them for the contamination.

In some implementations, the analysis of the image and/or sensor data to identify contaminants (or lack of contaminants) is performed at least partly on the onboard computing device 1112, operating for example as an edge device. For example, the device 1112 may include a processor with a central processing unit (CPU), a digital signal processor (DSP), a graphics processing unit (GPU), and/or a neural network processing unit that operate to analyze the image and/or sensor data on the device 1112.

In the example of FIG. 22, the signal(s) 1146 (possibly including the operational sensor data 1110, the contaminant sensor data 1111, the packer sensor data 1113, the location data 1144, and/or other information) are sent to the output computing device(s) 1126, and image(s) are presented in a user interface 1142 of a monitor application 1140 executing on the device(s) 1126. In some implementations, the operational sensor data 1110, location data 1144, and/or other information is analyzed on the device 1112 to identify triggering conditions, and the contaminant sensor data 1128 that is communicated to and presented on the device(s) 1126 includes images of refuse that are captured proximal to a time when the triggering condition is present. For example, one or more images of refuse from each container handled by a vehicle on its route can be captured during a time period that is a pre-determined offset prior to when the lift arm of the vehicle passes through a particular point in its container-emptying cycle. Those captured image(s), for each of one or more containers, can be communicated to the device(s) 1126 and presented in the user interface 1142 of the monitor application 1140. An operator can examine the images using the monitor application 1140, and use a control of the application to flag those particular image(s), if any, that contamination of refuse. The container(s) for which image(s) were flagged can be added to contamination information 1124 that is communicated to various parties, and in some instances the flagging of contamination instances can trigger action(s) 1138 to be performed, as described above. The contamination information 1124 can be included in reports that are generated and sent to various parties. Location data 1144 can include global positioning system ("GPS") data and/or sensor-based location data (e.g., proximity sensors or in-cylinder position sensors).

A large amount of sensor data and image data can be generated by the sensors and cameras respectively, and received by the onboard computing device 1112. In some implementations, a suitable data compression technique is employed to compress the sensor data, image data, location data, and/or other information before it is communicated in the signal(s), over network(s), to the remote device(s) 1120 and/or 1126 for further analysis. In some implementations, the compression is lossless, and no filtering is performed on the data that is generated and communicated to the onboard computing device and then communicated to the remote device(s). Accordingly, such implementations avoid the risk of losing possibly relevant data through filtering.

Sensors can be provided on the vehicle body to evaluate cycles and/or other parameters of various body components. For example, the sensors can measure the hydraulic pressure of various hydraulic components, and/or pneumatic pressure of pneumatic components. The sensors can also detect and/or measure the particular position and/or operational state of body components such as the top door of a refuse vehicle, an intermediate collection device attached to a refuse vehicle, a lift arm, a refuse compression mechanism, a tailgate, and so forth, to detect events such as a lift arm cycle, a pack cycle, a tailgate open or close event, an eject event, tailgate locking event, and/or other body component operations. Various operations of body components, positions of body components, and/or states of body components can be designated as triggering conditions that trigger the capture, communication, and/or analysis of images to identify contamination.

Packer sensors 1109 can be included on various components of a packer system, including, for example, auger screw 131, door 132, or ejector 136. A control system can be coupled to the packer sensors. In one implementation, each of a drive unit, auger screw 131, door actuator system 134, and ejector actuator system 138 includes sensors that are coupled a control system. In some implementations, a control system adjusts the auger system drive unit or the ejection actuator system to achieve the desired forces on an ejector. In certain implementations, a packer system can include load cells to measure compression and traction forces as the ejector is advanced or retracted or the auger system is rotated. A packer system can include other sensors. For example, a packer system can include additional load sensors, position sensors, angle sensors, or pressure sensors. Operation of the packer system can be controlled based on the information provided by the sensors. In some implementations, auger system and/or ejector operations are coordinated with contamination panel operations. For example, an auger screw may be turned on and off based on whether refuse has been released from a refuse support panel.

In some implementations, a vehicle includes a body controller that manages and/or monitors various body components of the vehicle. The body controller of a vehicle can be connected to multiple sensors in the body of the vehicle. The body controller can transmit one or more signals over the J1939 network, or other wiring on the vehicle, when the body controller senses a state change from any of the sensors. These signals from the body controller can be received by the onboard computing device that is monitoring the J1939 network. In some implementations, the onboard computing device has a GPS chip or other location determination devices that logs the location of the vehicle at each second or at other intervals. The onboard computing device can identify the body component signals (as distinguished from vehicle signals) and transmit them, along with the location (e.g., GPS) data and/or image data, to the remote computing device(s) 1120 and/or 1126, e.g., through a cellular connection, WiFi network, other wireless connection, or through a serial line, Ethernet cable, or other wired connection.

The sensor data 1110 can be analyzed, on the device 1112 or elsewhere, to identify specific signals from the body controller that indicate that a container has been serviced (e.g., the forks moved or the grabber moved, etc.). In some implementations, the signal can also be cross-referenced with the location data to locate where (e.g., geographically) the signal was captured. The signal can then be compared to a dataset of known container locations, to determine a triggering condition with greater confidence that through the use of the sensor data alone. For example, a lift arm event can be correlated with location data showing that the vehicle is at a location of a container, to infer that a triggering condition is present and that a container is being handled. The image(s) of the container, captured during or before the period when the container was handled (e.g., emptied into the vehicle), can be analyzed to look for contamination.

In some implementations, the onboard computing device is a multi-purpose hardware platform. The device can include a UDU (Gateway) and/or a window unit (WU) (e.g., a device with camera(s), sensors, and/or any computing device) to record video and/or audio operational activities of the vehicle. The onboard computing device hardware subcomponents can include, but are not limited to, one or more of the following: a CPU, a memory or data storage unit, a CAN interface, a CAN chipset, NIC(s) such as an Ethernet port, USB port, serial port, I2C lines(s), and so forth, I/O ports, a wireless chipset, a GPS chipset, a real-time clock, a micro SD card, an audio-video encoder and decoder chipset, and/or external wiring for CAN and for I/O. The device can also include temperature sensors, battery and ignition voltage sensors, motion sensors, an accelerometer, a gyroscope, an altimeter, a GPS chipset with or without dead reckoning, and/or a digital can interface (DCI). The DCI cam hardware subcomponent can include the following: CPU, memory, can interface, can chipset, Ethernet port, USB port, serial port, I2C lines, I/O ports, a wireless chipset, a GPS chipset, a real-time clock, and external wiring for CAN and/or for I/O. In some implementations, the onboard computing device is a smartphone, tablet computer, and/or other portable computing device that includes components for recording video and/or audio data, processing capacity, transceiver(s) for network communications, and/or sensors for collecting environmental data, telematics data, and so forth.

The onboard computing device can determine the speed and/or location of the vehicle using various techniques. CAN_SPEED can be determined using the CAN interface and using J1939 or J1962, reading wheel speed indicator. The wheel speed can be created by the vehicle ECU. The vehicle ECU can have hardware connected to a wheel axle and can measure rotation with a sensor. GPS_SPEED can provide data from GPS and be linked, such as to a minimum of three satellites and a fourth satellite to determine altitude or elevation. Actual coordinates of the vehicle on the map can be plotted and/or verified, to determine the altitude of vehicle. SENSOR_SPEED can be provided using motion sensors, such as accelerometer, gyroscope, and so forth. These hardware component may sample at high frequency and may be used to measure delta, rate of acceleration, and derive speed from the measurements. Other speed sensors can also be used. LOCATION_WITH_NO_GPS can be provided using the GPS chipset with dead reckoning, and can derive actual vehicle location and movement by using a combination of SENSOR_SPEED and CAN_SPEED. Even if GPS is not available, some systems can determine accurately where the vehicle is based on such dead reckoning.

Vehicle 102 can include any suitable number and type of body components 1104 according to the design and/or purpose of the vehicle 102. For example, a vehicle 102 can include body components 1104 including, but not limited to: a lift arm, a grabber mechanism, a top lid or hopper lid, a back gate or tailgate, and a hopper to hold refuse during its transport. One or more sensors 1106 can be situated to determine the state and/or detect the operations of the body components 1104. A lift arm, for example, can include a sensor 1106 that is arranged to detect the position of the arm, such as during its cycle to lift a container and empty it into the hoper. The vehicle 102 can also include one or more contaminant sensors 1108 that capture images in proximity to the vehicle 102 and/or, in some instances, of the interior of the vehicle. In the example shown, a contaminant sensor 1113 (e.g., a camera) is positioned to visualize refuse in the vehicle 102 or falling into the vehicle 102, such as refuse in the hopper or intermediate collection device of the vehicle 102. The contaminant sensor(s) 1108 may also be placed in other positions and/or orientations.

The operational sensor data can be analyzed to determine the triggering condition that indicates a container is being serviced, was serviced, or is about to be serviced. Based on the triggering condition, one or more images captured by the camera(s), and/or other contaminant sensor data captured by other contaminant sensors, can be analyzed to determine the presence of any contamination. For example, a triggering condition can be a particular point in the cycle of the lift arm to lift a container and empty it into the hopper. As another example, a triggering condition can be a cycle of the top lid (e.g., lid to the hopper) that indicates the top lid is being opened to empty a container into the hopper. As another example, a triggering condition can be a cycle of the grabber to grab a container for emptying into the hopper. The triggering condition can be used to determine a time, or time period, of the image(s) to be analyzed. For example, the time period can be a predetermined offset prior to or after the triggering condition, such that the images analyzed are those that were captured just prior to or after the container being emptied into the hopper. In a particular example, the analyzed images can include images that were captured between 5 and 10 seconds after the completion of the cycle of the lift arm to lift a container and empty it into the hopper or intermediate collection device. Accordingly, the analyzed images and/or other contaminant sensor data can include data captured immediately after a service event in which a container is emptied into the hopper or intermediate collection device of a refuse vehicle.

In some implementations, the operational sensor data can be used in correlation with location data to determine the presence of a triggering condition that determines a time period for the contaminant sensor data to be analyzed. For example, the detection of a lift arm completing its cycle, in conjunction with a determination that the current GPS location of the vehicle corresponds to a known location of a container that is serviced, can be used as a triggering condition to determine one or more images and/or other contaminant sensor data to be analyzed. Image(s) and/or other contaminant sensor data can be generated with a timestamp indicating the date and/or time when they were captured. The image(s) and/or other contaminant sensor data can also include metadata describing which contaminant sensor (e.g., camera and/or other sensor) generated the data. The timestamp and/or other metadata can be used to determine which image(s) and/or other contaminant sensor data are to be analyzed to identify contamination.

In some implementations, the onboard computing device 1112 (e.g., UDU) collects operational sensor data 1110 on an ongoing basis and/or periodically (e.g., every second, every 5 seconds, etc.), and the data is analyzed to determine whether a triggering condition is present. Contaminant sensor data 1128 can also be generated and received on an ongoing basis, and a time window of image data can be retrieved and analyzed to determine contamination, in response to detecting a triggering condition. For example, the time window of images from the triggering condition until 5 seconds after the triggering condition can be analyzed to look for contamination. In some instances, the platform knows when a particular service event occurred, e.g., based on the operational sensor data 1110 and/or location of the vehicle. That service event can be correlated to the image data that is being generated by the cameras. For example, a portion of the image data (including one or more images) within a time period after or including the time of the service event (e.g., 5 seconds after to emptying a container) can be analyzed to capture image(s) of the refuse. The image data can include any number of still images. In some implementations, the image data can include video data, such that the image(s) are frames of the video data.

In some implementations, the determination of a triggering condition can be further based on the location and/or movement of the vehicle. For example, a triggering condition can be determined based on the vehicle moving at less than a threshold speed (or decelerating to below a threshold speed) prior to the operational sensor data indicating a particular operational state of body components, and/or when the vehicle is within a threshold distance (e.g., within 10-15 feet) of a known location of a container to be handled. One or more images can be retrieved that visualize the refuse after the container is emptied into the hopper or intermediate collection device (e.g., at a time that is determined based on the operational sensor data). Velocity, acceleration (or deceleration), and/or location of the vehicle can be based at least partly on information received from the vehicle's onboard systems, such as a GPS receiver and/or telematics sensor(s) describing the current speed, orientation, and/or location of the vehicle at one or more times.

In some implementations, the image(s) can be captured automatically by the cameras and stored (e.g., for a period of time) in the storage 1116 of device 1112. The particular image(s) from within the time period of interest (e.g., prior to emptying the container), based on the presence of the triggering condition, can be retrieved and analyzed automatically in response to detecting the triggering condition. In some implementations, the generation and/or retrieve of image(s) for analysis can be based at least partly on a command received from an operator. For example, a driver or other personnel present on the vehicle can push a button on, or otherwise issue a command to, the device 1112, to request image capture when the vehicle is within suitable distance of the container to be handled.

In some implementations, the data to be uploaded to the device(s) 1120 and/or device 1126 can be packaged, in the signal(s) 1146, into bundles of (e.g., telemetry) data every 5-10 minutes. This bundle of data can be compressed and/or encrypted, and transmitted to the remote device(s) over a suitable network, such as a wireless cell network. In some implementations, the uploaded data includes the relevant data for one or more particular container handling events. For example, the operational sensor data and/or location data can be analyzed on the device 1112 to determine the presence of a triggering condition, and the particular image(s) (and/or video data) for the appropriate time period based on the triggering condition can be uploaded for analysis along with the corresponding time period of telemetry data, operational sensor data, and/or location data. In some instances, the data can be uploaded in real time with respect to the handling of the container, or the data can be uploaded in batches periodically. Data upload may be delayed until a suitable network connection is available between the onboard computing device 1112 and the remote device(s) 1120 and/or 1126.

In some implementations, at least a portion of the analysis that is described herein as being performed on the analysis computing device(s) 1120 and/or the output device(s) 1126 can be performed by the onboard computing device 1112 instead of or in addition to being performed on the analysis computing device(s) 1120 and/or the output device(s) 1126.

In some implementations, the analysis of the image data to identify contamination (and/or other issues), through a review application and/or an ML engine, can be performed in real time with respect to the generation of the images (e.g., during the vehicle's route to collect refuse from the containers). In some implementations, the analysis can be performed at some time after the image(s) were generated and/or after the vehicle has completed its route.

As used herein, a real time process or operation describes a process or operation that is performed in response to detecting a triggering condition (e.g., event), in which the real time process is performed without any unnecessary delay following the triggering condition, apart from the delay that is incurred due to the limitations (e.g., speed, bandwidth) of any networks being used, transfer of data between system components, memory access speed, processing speed, and/or computing resources. A real time process or operation may be performed within a short period of time following the detection of the triggering condition, and/or may be performed at least partly concurrently with the triggering condition. A triggering condition may be the receipt of a communication, the detection of a particular system state, and/or other types of events. In some instances, a real time process is performed within a same execution path, such as within a same process or thread, as the triggering condition. In some instances, a real time process is performed by a different process or thread that is created or requested by a process that detects the triggering condition. A real time process may also be described as synchronous with respect to the triggering condition.

As described herein, the triggering condition can be one or more of the following: a particular operational state of a body component (e.g., a position of the lift arm in its cycle), a velocity (e.g., speed and/or direction of travel) of the vehicle, an acceleration or deceleration of the vehicle, a location of the vehicle, and/or other criteria. The presence of the triggering condition can cause the collection and/or analysis of the image data to identify contamination and/or other issues present in the refuse collected from one or more containers.

The application can generate a report of contamination or other issues. The application can also send signals that trigger action(s) to be performed, and/or perform the action(s) itself. Such action(s) can include a charge against an entity responsible for contamination of the refuse in the container. Action(s) can also include sending notification(s) to such entities and/or individuals responsible for administering the refuse collection vehicles, to notify the recipients of identified contamination or other conditions exhibited by containers. The application can provide additional information to the recipients of the notifications, to demonstrate the identified problem, including image(s) of the refuse contamination, time, date, and/or location information, and so forth.

Figure 23:
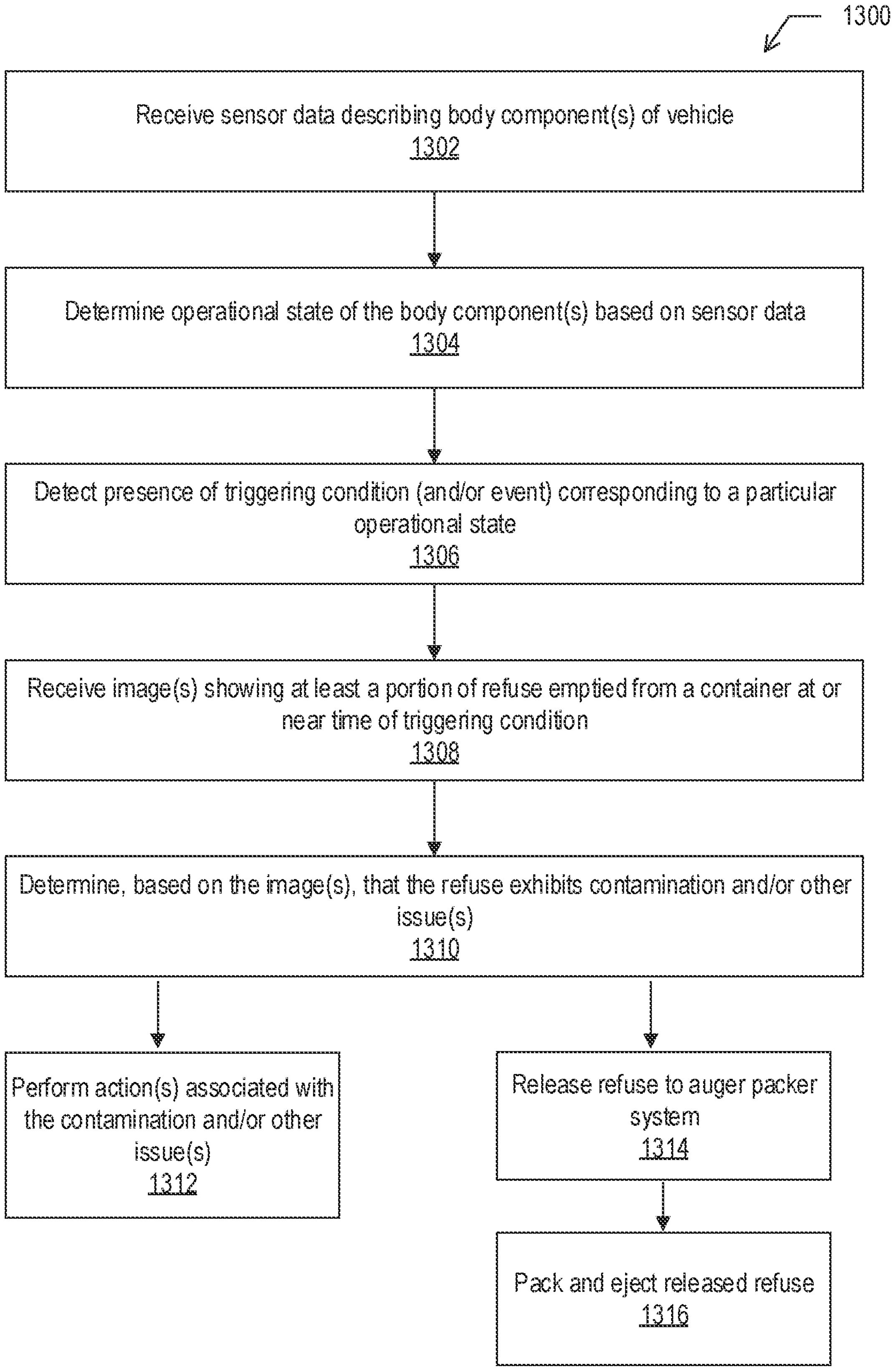
FIG. 23 depicts a flow diagram of an example process for identifying container contamination and releasing refuse for packing and ejection, according to implementations of the present disclosure.

FIG. 23 depicts a flow diagram 1300 of an example process for identifying container contamination and/or other issue(s), according to implementations of the present disclosure. Operations of the process can be performed by one or more analysis module(s), an ML engine, the monitor application 1140, the user interface 1142, and/or other software module(s) executing on the onboard computing device 1112, an analysis computing device(s), the output device(s) 1126, and/or elsewhere.

Operational sensor data is received (1302), and analyzed to determine (1304) an operational state and/or position of one or more body components of the vehicle. The presence of a triggering condition is detected (1306) based at least partly on a particular operational state of the body component(s), such as the position of a lift arm at a particular point in its cycle to empty a container, a state of a grabber that is grabbing a container, and/or the opening of a hopper lid to receive emptied refuse into the hopper. As described above, the triggering condition can also be based at least partly on other information, such as the speed, deceleration, and/or location of the vehicle prior to handling a container. Image(s) are received (1308) showing at least a portion of refused emptied from a container at or near the time of the triggering condition, such as a period of time (e.g., 10-15 seconds) prior to the triggering condition. Based on the image(s), a determination is made (1310) whether the container exhibits contamination and/or other issue(s). As described above, the determination can be performed by an image classification engine (e.g., through ML-based model application), and/or through an operator reviewing the image(s) in the application 1140. One or more actions can be performed (1312) based on the identified contamination and/or other issue(s). In some implementations, portions or particular items of refuse can be separated, sorted, or treated based on information from the images and sensor data.

A determination can be made to release the refuse from a refuse support panel. Up on such a determination, the refuse can be released to an auger packer system (1314). Release of the refuse can include moving a refuse support panel, such as described herein. Refuse that has been released can be compacted by the auger system, a platen packer system, or a combination of both (1316).

The image(s) can be stationary image(s) of the refuse, captured after the refuse has been emptied into a hopper of the RCV and/or a intermediate collection device conveyed by the RCV. In some implementations, the image(s) can be image(s) of the refuse as it is falling into the intermediate collection device. Image(s) can be still image(s) and/or video data as described above, and can include visible light images, IR images, UV images, and/or image(s) from other spectrum ranges. In some implementations, a system makes a determinations on refuse based on natural radiation of the refuse. Other types of contaminant sensor data can also be analyzed, in addition to or instead of analyzing the image data, to identify contamination as described above.

In certain implementations, a vacuum system is used to identify items or materials of refuse being introduced into a refuse collection vehicle. As one example, a vacuum system can be used in combination to detect a change in pressure due to particular items, such as plastic bags.

In implementations where the analysis is performed at least partly on the onboard computing device 1112 (e.g., edge processing), the determination of a triggering condition as described in 1302-1306 may not be employed, and may at least partly be omitted from the process. With the analysis (e.g., ML analysis) performed on the device 1112, the refuse stream can be evaluated in real time as the image data and/or sensor data is received, without a body component-based triggering event that prompts the analysis.

Additional implementations and features of receiving, processing and packing refuse in RCVs, analyzing refuse to determine different types of materials that may be present in the refuse, collecting image(s) and/or other contaminant sensor data of the refuse, employing machine learning to analyze the image(s) and/or other contaminant sensor data to detect the presence (or absence) of various types of materials (e.g., recyclable and/or non-recyclable materials) in the refuse, and sending alert notifications and/or performing other action(s) based on identifying different types of materials (e.g., contamination) in the refuse, are described in the '903 application. Features, components, or steps described herein can, in various implementations, be combined with those of the '903 application.

Figure 24:
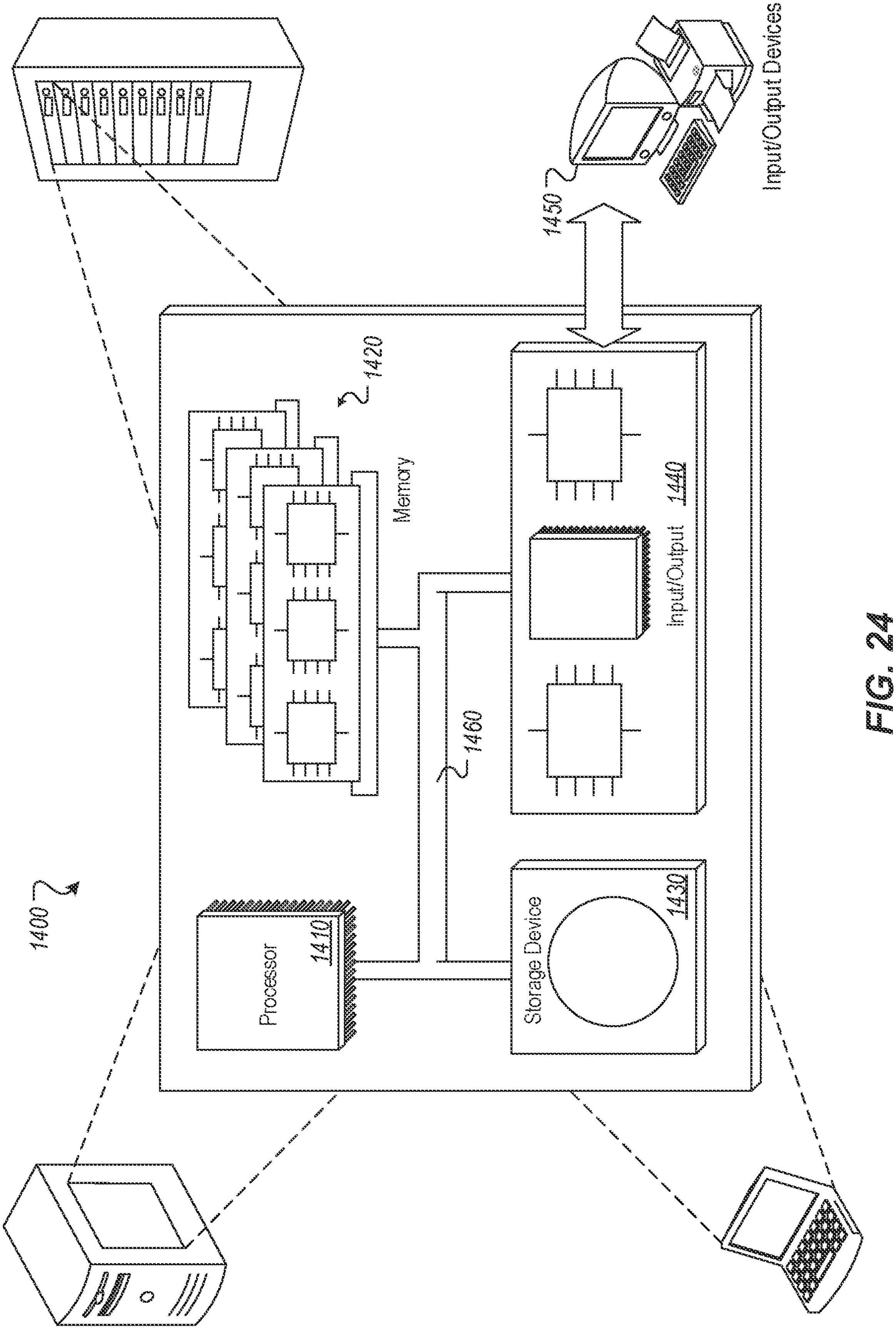
FIG. 24 depicts an example computing system, according to implementations of the present disclosure.

FIG. 24 depicts an example computing system, according to implementations of the present disclosure. The system 1400 may be used for any of the operations described with respect to the various implementations discussed herein. For example, the system 1400 may be included, at least in part, in one or more of the onboard computing device 1112, the analysis computing device(s) 1120, the output device(s) 1126, and/or other computing device(s) or system(s)

described herein. The system 1400 may include one or more processors 1410, a memory 1420, one or more storage devices 1430, and one or more input/output (I/O) devices 1450 controllable via one or more I/O interfaces 1440. The various components 1410, 1420, 1430, 1440, or 1450 may be interconnected via at least one system bus 1460, which may enable the transfer of data between the various modules and components of the system 1400.

The processor(s) 1410 may be configured to process instructions for execution within the system 1400. The processor(s) 1410 may include single-threaded processor(s), multi-threaded processor(s), or both. The processor(s) 1410 may be configured to process instructions stored in the memory 1420 or on the storage device(s) 1430. For example, the processor(s) 1410 may execute instructions for the various software module(s) described herein. The processor(s) 1410 may include hardware-based processor(s) each including one or more cores. The processor(s) 1410 may include general purpose processor(s), special purpose processor(s), or both.

The memory 1420 may store information within the system 1400. In some implementations, the memory 1420 includes one or more computer-readable media. The memory 1520 may include any number of volatile memory units, any number of non-volatile memory units, or both volatile and non-volatile memory units. The memory 1420 may include read-only memory, random access memory, or both. In some examples, the memory 1520 may be employed as active or physical memory by one or more executing software modules.

The storage device(s) 1430 may be configured to provide (e.g., persistent) mass storage for the system 1400. In some implementations, the storage device(s) 1430 may include one or more computer-readable media. For example, the storage device(s) 1430 may include a floppy disk device, a hard disk device, an optical disk device, or a tape device. The storage device(s) 1430 may include read-only memory, random access memory, or both. The storage device(s) 1430 may include one or more of an internal hard drive, an external hard drive, or a removable drive.

One or both of the memory 1420 or the storage device(s) 1430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 1400. In some implementations, the CRSM may include a data store that provides storage of computer-readable instructions or other information in a non-transitory format. The CRSM may be incorporated into the system 1400 or may be external with respect to the system 1500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 1410 and the memory 1420 may be supplemented by, or incorporated into, one or more application-specific integrated circuits (ASICs).

The system 1400 may include one or more I/O devices 1450. The I/O device(s) 1450 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 1450 may also include one or more output devices such as a display, LED(s), an audio output device (e.g., a speaker), a printer, a haptic output device, and so forth. The I/O device(s) 1450 may be physically incorporated in one or more computing devices of the system 1500, or may be external with respect to one or more computing devices of the system 1500.

The system 1400 may include one or more I/O interfaces 1440 to enable components or modules of the system 1400 to control, interface with, or otherwise communicate with the I/O device(s) 1450. The I/O interface(s) 1440 may enable information to be transferred in or out of the system 1400, or between components of the system 1400, through serial communication, parallel communication, or other types of communication. For example, the I/O interface(s) 1440 may comply with a version of the RS-232 standard for serial ports, or with a version of the IEEE 1284 standard for parallel ports. As another example, the I/O interface(s) 1440 may be configured to provide a connection over Universal Serial Bus (USB) or Ethernet. In some examples, the I/O interface(s) 1540 may be configured to provide a serial connection that is compliant with a version of the IEEE 1394 standard.

The I/O interface(s) 1440 may also include one or more network interfaces that enable communications between computing devices in the system 1400, or between the system 1400 and other network-connected computing systems. The network interface(s) may include one or more network interface controllers (NICs) or other types of transceiver devices configured to send and receive communications over one or more communication networks using any network protocol.

Computing devices of the system 1400 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 1400 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth.

Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Recycling streams can include an initially unknown amount of contamination (e.g., non-recyclable material). Contaminants may vary from location to location and can be introduced by customers and/or interlopers (e.g., mid-stream contamination). The cost of contamination is typically borne by the recycling facility and may result in lost recycling material or disabled sorting machinery. The cost can also be borne by waste collection services as lost recycling material revenue.

The implementations described herein operate to quantify the type and amount of contaminants in the recycling stream in a timely manner. Increasing efficiency in solid waste collection systems can be accomplished through coordination between many disparate elements. Increasing efficiency can depend on collecting data from the waste collection environment, automating analysis of the collected data, and communicating the automated analysis to impacted parties. For example, reports of contamination can be used by one or more of the following entities:

Waste collection service providers to identify, quantify, and isolate the cost of contamination;

Waste collection service providers to educate and change customer behavior; and/or A recycling facility to reduce or eliminate contaminants before the sorting process begins.

Accordingly, in some implementations an AI system is applied to refuse collection systems and services. Such a system can employ ML techniques, such as Deep Learning techniques, to automatically learn, reconfigure, and improve over time. Implementations can achieve contaminant detection, quantification, and/or reduction by providing on or more of the following:

On-the-edge camera and sensor coverage using vehicle-specific positioning;

On-the-edge sensor fusion of same and/or different contaminant sensor types;

On-the-edge processing capable of executing machine learning detection application;

Cloud-based ML detection systems;

Wide-area communications to transmit sensor data and report results of contaminant detection;

Dynamic contaminant reporting and rerouting of trucks prior to arrival at recycling facilities; and/or Feedback from multiple sources to reinforce learning and improve detection accuracy.

Waste (refuse) collection can include, but is not limited to, the collection of garbage (e.g., to transport to a landfill), recyclables (e.g., to transport to a recycling facility), and/or yard waste (e.g., to transport to a mulching facility). Waste collection can include collection from residential sites (e.g., small bins), commercial sites (e.g., large bins), and/or other types of sites.

The waste collection vehicles (e.g., trucks) can include a variety of truck types (e.g., front-loader, side-loader, rear-loader, etc.). Different data may be available in different types of trucks, based on the different telemetry collected, differing numbers of sensors, different types of sensors, and so forth. Different trucks may also provide different computing environment, such as environments that support one or more of the following: data streaming, data recording, data recording and uploading, single CPU, distributed computing, and so forth. Different communications systems may be supported by different trucks, such as communications that vary with respect to bandwidth, cost, medium, and so forth.

Entities interacting with the systems can include, but are not limited to, one or more of the following: truck driver/crew, event reviewer, quality control manager (e.g., reviewing validity of the driver and reviewer), truck driver/crew trainer, customer service agents, customers (e.g., residents, businesses, and/or municipalities with waste bins collected by trucks), waste collection service providers (e.g., public municipalities, private companies), and/or facility managers.

Certain implementations provide a Contaminant Detection Network, which can include any suitable number and type of computing resources and storage devices connected via communications systems to a multitude of trucks. Some such implementations are described in the '903 application.

Certain implementations may include the use of accelerometer data, image classification, or audio data. Some such implementations are described in the '903 application.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

In various implementations described above, systems have been described including cameras that capture image data of refuse on a refuse support panel. In other implementations, systems such as the ones described can include any of a variety of sensor types instead of, or in addition to, cameras.

In some implementations, any or all of an auger system, ejector system, or door actuator system may include electric motors. In one example, an all-electric RCV uses electric motors for an auger screw system, a plate ejector system, and a door actuator. In certain implementations, auger systems, plate ejector systems, and door actuator systems use hydraulic motors.

In various examples described above, a packer system includes a single linear actuator. In other implementations, a packer system can include two or more linear actuators.

In various examples described above, a packer system includes an auger screw. In other implementations, a packer system may include other types of packing devices instead of, or in addition to, an auger screw. For example, certain implementations may include only a plate ejector system.

In various examples described above, a packer system includes a single auger screw. In other implementations, a packer system can include two or more auger screws.

In various implementations described above, an actuator for an ejector or door is described and shown as a linear motion device. Actuators for an ejector or door can, however, produce other types of motion. For example, an actuator for a door or ejector can be a rotary motion device.

As used herein, to "inspect" means to examine or view. Inspection can be done entirely by machine or device (such as by various imaging devices or sensing devices and methods described herein), or with human involvement, or by a combination thereof. In the context of this disclosure, "inspection" does not require visual examination.

As used herein, a "packer" includes any device, mechanism, or system that packs or compacts material in a compartment or ejects material from a compartment.

As used herein, an "ejector" includes any component or combination of components that can be used to push material to compact the material or eject the material from a compartment or vessel. As one example, an ejector may be a metal plate that collects and moves refuse as the ejector is pushed along the floor of a storage compartment.

As used herein, a "driver" includes any device, mechanism, or system that imparts force to mechanically drive one or more components. Examples of a driver include an electric motor, a hydraulic motor, or an engine. A driver may also include gearboxes, belts, chain drives, or any other power transmission devices.

As used herein, a "storage compartment" includes a compartment in which refuse can be stored. In some cases, refuse may remain in the storage compartment while the vehicle travels to a disposal facility. In other cases, refuse may be immediately ejected from the storage compartment as the packer system pushes the refuse through the vehicle.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claim(s).

The invention claimed is:

1. A refuse collection vehicle defining forward and rearward directions of travel along a ground surface, a downward direction toward the ground surface, and an upward direction away from the ground surface, comprising:

a body comprising a storage compartment;

a packer system coupled to the body, the packer system comprising:

an auger screw operable to rotate to advance refuse into the storage compartment; and a driver coupled to the auger screw and operable to rotate the auger screw such that refuse is packed into the storage compartment;

one or more refuse support panels coupled to the body, wherein the one or more refuse support panels are configurable to support refuse while characteristics of the refuse are sensed;

one or more sensors configured to capture sensor data of refuse while the refuse is on at least one of the one or more refuse support panels, the one or more sensors comprising a sensor located above the one or more refuse support panels relative to the upward direction such that refuse on the one or more refuse support panels is within a field of view of the sensor;

a refuse support panel actuator system configured to move at least one of the one or more refuse support panels such that refuse is released from the at least one of the one or more refuse support panels into the packer system; and a control system configured to control the auger screw based at least in part on the sensor data.

2. The refuse collection vehicle of claim 1, wherein the refuse support panel actuator system is configured to move at least one of the one or more refuse support panels to drop at least a portion of the refuse from the one or more refuse support panels onto the auger screw of the packer system.

3. The refuse collection vehicle of claim 1, wherein at least one of the one or more refuse support panels comprises a flat surface, wherein the refuse support panel actuator system is configured to hold the flat surface substantially horizontally while characteristics of the refuse on the at least one of the one or more refuse support panels are sensed.

4. The refuse collection vehicle of claim 1, wherein the refuse support panel actuator system is configured to move the at least one of the one or more refuse support panels to change an angle of inclination of the at least one of the one or more refuse support panels such that at least a portion of the refuse from the at least one of the one or more refuse support panels is released onto the auger screw of the packer system.

5. The refuse collection vehicle of claim 1, wherein the one or more refuse support panels comprise a pair of doors, wherein the refuse support panel actuator system is configured to swing the doors away from one another to drop refuse from the one or more refuse support panels onto the auger screw of the packer system.

6. The refuse collection vehicle of claim 1, wherein the refuse support panel actuator system comprises a linear actuator configured to move at least one of the one or more refuse support panels such that refuse is released from the at least one of the one or more refuse support panels onto the auger screw.

7. The refuse collection vehicle of claim 1, wherein at least one of the one or more refuse support panels comprises a concave upper surface configured to hold refuse during sensing.

8. The refuse collection vehicle of claim 1, wherein the refuse support panel actuator system is configured to rotate at least one of the one or more refuse support panels to release refuse from the at least one of the one or more refuse support panels onto the auger screw of the packer system.

9. The refuse collection vehicle of claim 1, wherein the refuse support panel actuator system is configured to translate at least one of the one or more refuse support panels to release at least a portion of the refuse from the at least one of the one or more refuse support panels onto the auger screw of the packer system.

10. The refuse collection vehicle of claim 1, wherein the at least one of the one or more refuse support panels comprises a conveyor belt, wherein at least one of the one or more sensors is configured to capture at least a portion of the sensor data of the refuse while the refuse is carried on the conveyor belt.

11. The refuse collection vehicle of claim 1, wherein at least one of the one or more sensors comprises a camera comprising one or more image sensors.

12. The refuse collection vehicle of claim 1, further comprising a lifting component configured to empty a container of refuse onto at least one of the one or more refuse support panels.

13. The refuse collection vehicle of claim 1, further comprising a separator device configured to separate at least one item of refuse on the one or more refuse support panels from at least one other item of refuse on the one or more refuse support panels.

14. The refuse collection vehicle of claim 13, wherein the separator device comprises a robotic arm operable to pick items from at least one of the one or more refuse support panels.

15. The refuse collection vehicle of claim 1, further comprising a computing device configured to distinguish, based on sensor data captured by one or more imaging devices, at least one item of refuse on the at least one of the one or more refuse support panels from at least one other item of refuse on the at least one of the one or more refuse support panels.

16. The refuse collection vehicle of claim 1, further comprising a computing device configured to detect, based on sensor data captured by the one or more sensors, contamination in the refuse on the one or more refuse support panels.

17. The refuse collection vehicle of claim 1, wherein the control system comprises a computing device configured to control at least one of the one or more sensors, wherein the computing device is configured to detect, in response to operational sensor data indicating an operational state of one or more body components of the refuse collection vehicle, a triggering condition for capturing an image.

18. The refuse collection vehicle of claim 1, wherein the control system comprises a computing device configured to control the refuse support panel actuator system, wherein the computing device is configured to detect, in response to the sensor data, a triggering condition for releasing refuse from at least one of the one or more refuse support panels into the packer system.

19. The refuse collection vehicle of claim 1, wherein the control system comprises a computing device configured to:
- control the refuse support panel actuator system; and
- control the auger screw based at least in part on the control of the refuse support panel actuator system.

20. The refuse collection vehicle of claim 19, wherein, to control the auger screw, the computing device is configured to:
- implement, based on a determination that the refuse has been released from the at least one of the one or more support panels into the packer system, a first operation state of the auger screw; and
- implement, based on a determination that the refuse has not been released from the at least one of the one or more support panels into the packer system, a second operation state of the auger screw, wherein the second operation state is different from the first operation state.

21. A method of collecting refuse, comprising:
- placing refuse on a panel in a refuse collection vehicle;
- capturing, using one or more sensors, sensor data associated with one or more characteristics of the refuse on the panel, the one or more sensors comprising a sensor located above the panel such that the refuse on the panel is within a field of view of the sensor and such that, relative to the panel, the sensor is farther away from an auger screw of the refuse collection vehicle;
- moving the panel to release at least a portion of the refuse from the panel; and
- controlling, using a control system, the auger screw based at least in part on the sensor data, wherein the controlling comprises:
  - turning the auger screw to pack at least a portion of the refuse that has been released from the panel into a storage compartment.

22. The method of collecting refuse of claim 21, wherein capturing the sensor data comprises capturing one or more images of the refuse on the panel.

23. The method of collecting refuse of claim 21, further comprising detecting contamination in the refuse from at least one of the one or more characteristics of the refuse on the panel.

24. The method of collecting refuse of claim 21, wherein moving the panel comprises dumping at least a portion of the refuse on the panel into a packer system.

25. The method of collecting refuse of claim 21, further comprising separating at least one item of refuse on the panel from at least one other item of refuse on the panel.

26. A refuse collection vehicle, comprising:
- a body comprising a storage compartment;
- a packer system coupled to the body, wherein the packer system is operable to pack refuse into the storage compartment;
- one or more refuse support panels coupled to the body, wherein the refuse support panels are configurable to support refuse while characteristics of the refuse are sensed;
- one or more sensing devices configured to capture sensor data associated with one or more characteristics of refuse while the refuse is on at least one of the one or more refuse support panels;
- a refuse support panel actuator system comprising one or more actuators configured to move at least one of the one or more refuse support panels such that refuse is dropped into the packer system; and
- a control system configured to control the packer system based at least in part on the sensor data.

27. The refuse collection vehicle of claim 26, wherein the control system comprises a computing device configured to control the refuse support panel actuator system, wherein the computing device is configured to detect, in response to the sensor data, a triggering condition for releasing refuse from at least one of the one or more refuse support panels into the packer system.

28. A method of collecting refuse, comprising:
- placing refuse on a panel on or in a refuse collection vehicle;
- capturing, using one or more sensors, sensor data associated with one or more characteristics of the refuse on the panel;
- moving the panel to drop at least a portion of the refuse from the panel; and
- controlling, using a control system, a packer system based at least in part on the sensor data, wherein the controlling comprises:
  - causing the packer system to pack at least a portion of the refuse that has been released from the panel into a storage compartment.

* * * * *